Dec. 17, 1963    R. H. THORNER    3,114,427
CONTROL APPARATUS FOR MOTOR VEHICLE REGULATOR
Filed Feb. 3, 1958    5 Sheets-Sheet 1
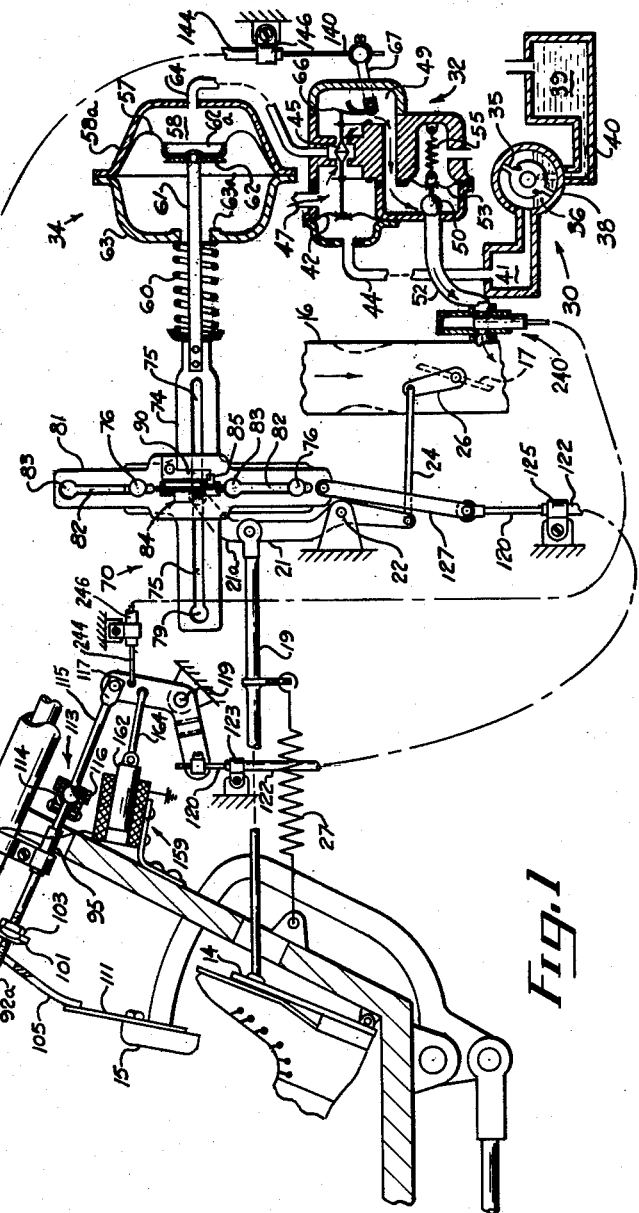
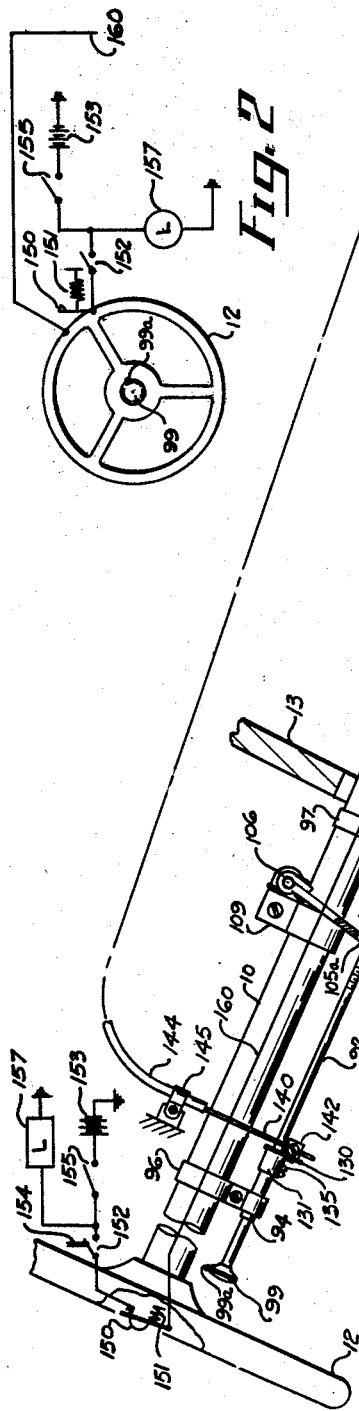
INVENTOR.
ROBERT H. THORNER
BY Owen & Owen

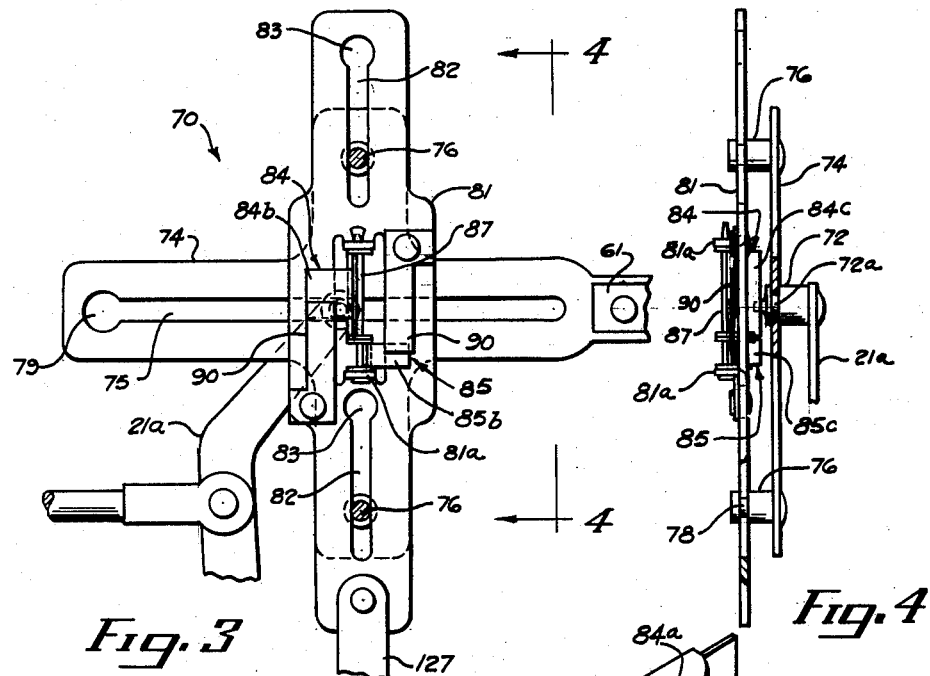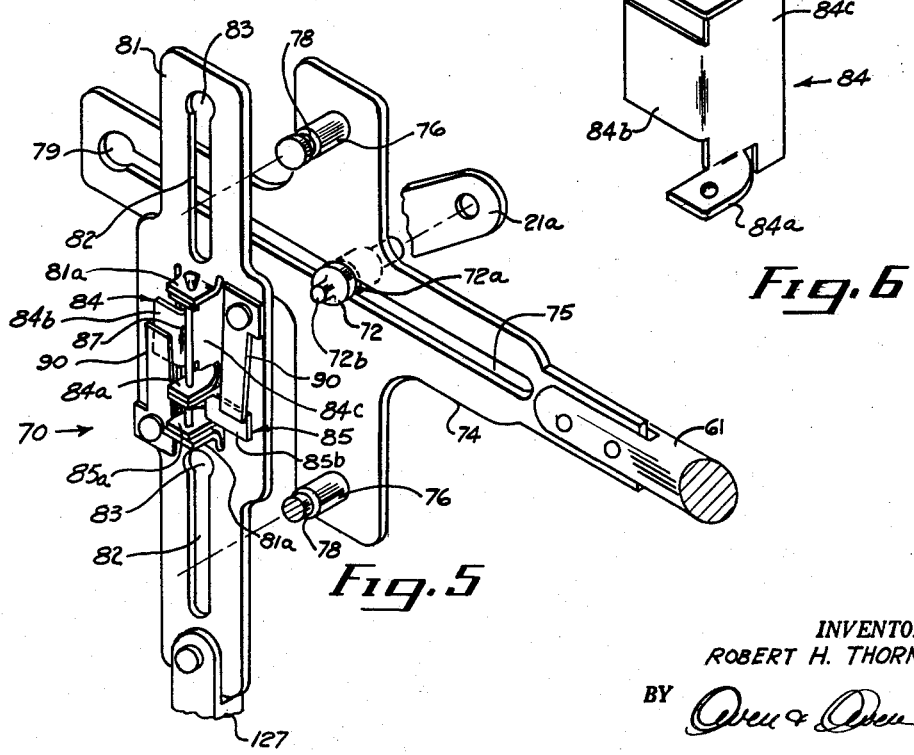

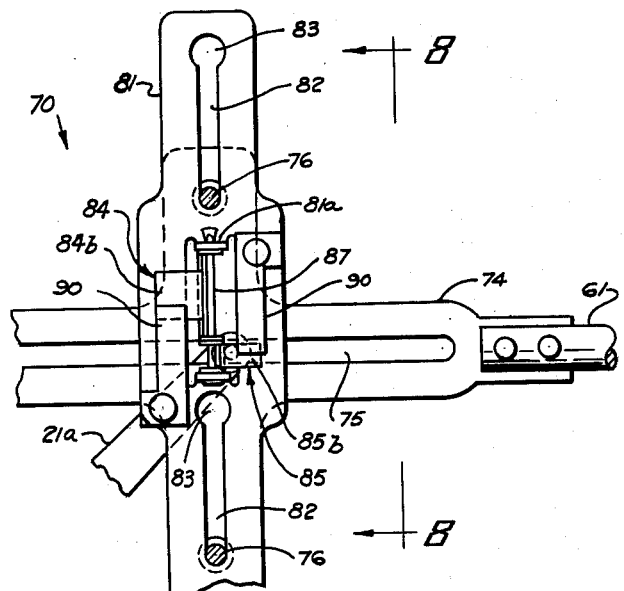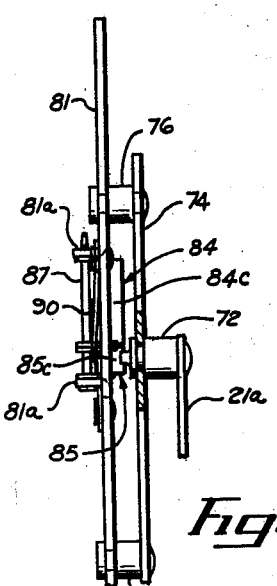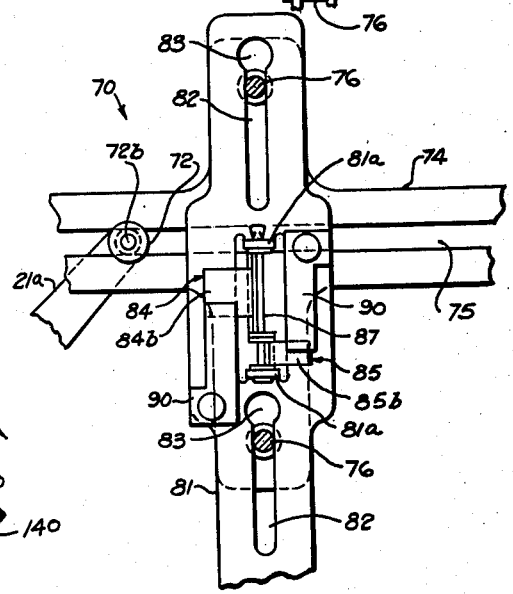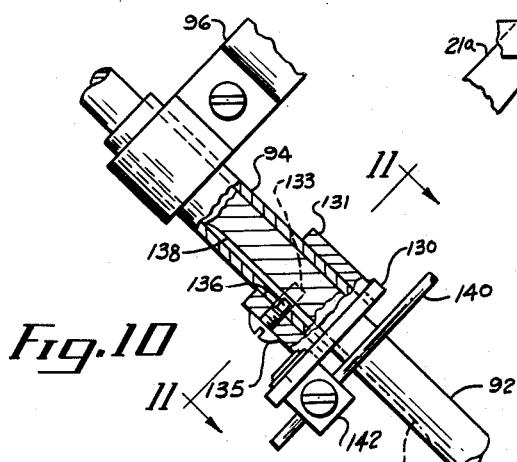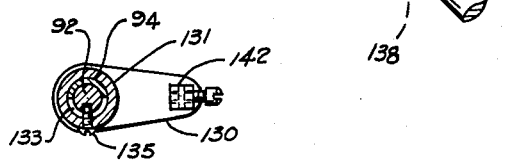

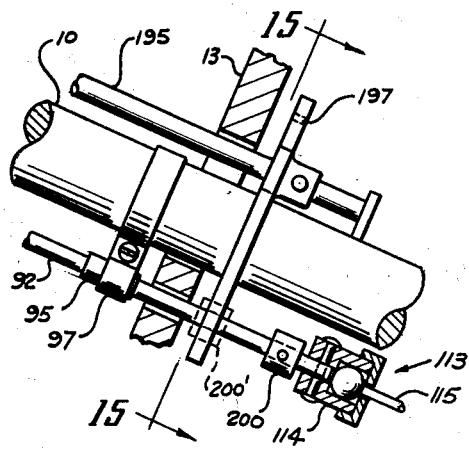
Fig.14
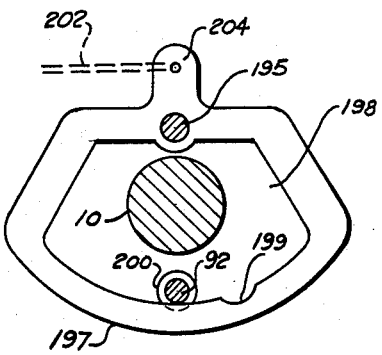
Fig.15
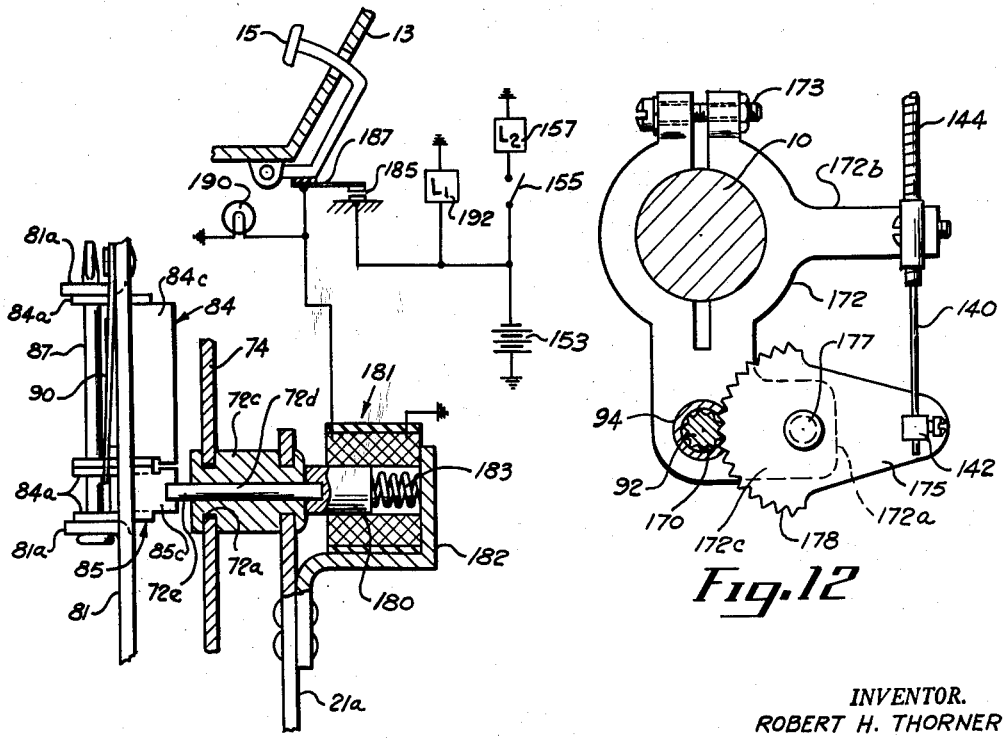
Fig.13
Fig.12
INVENTOR.
ROBERT H. THORNER

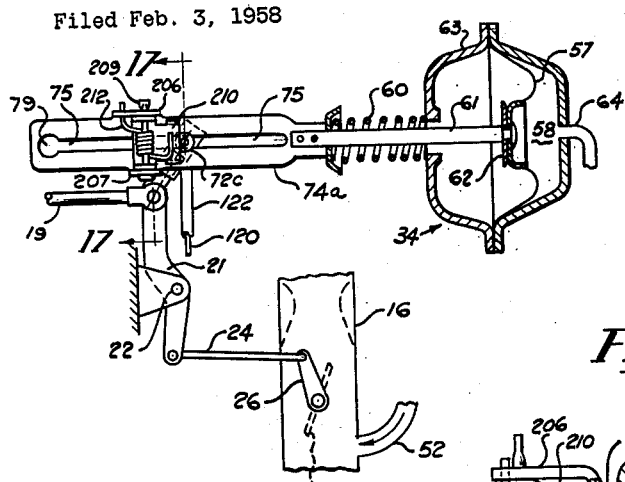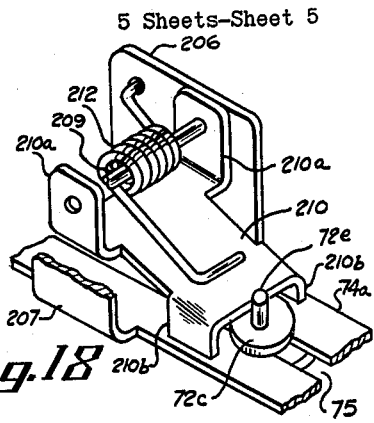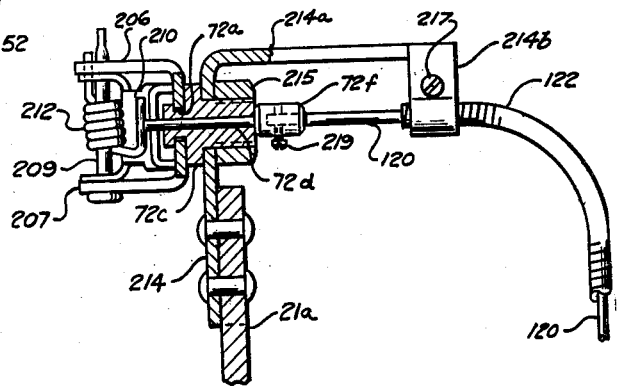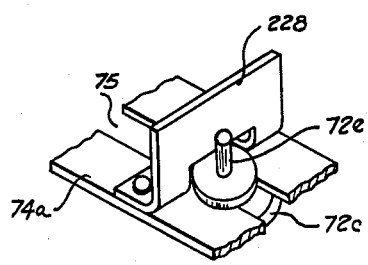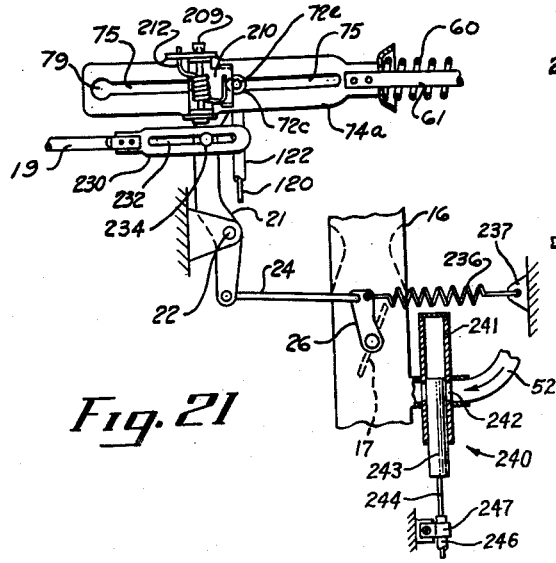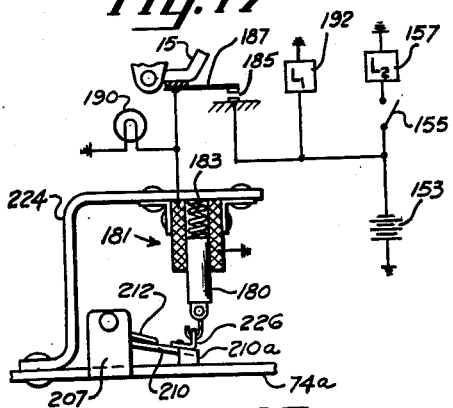

3,114,427
CONTROL APPARATUS FOR MOTOR VEHICLE
REGULATOR
Robert H. Thorner, 8750 W. Chicago Blvd.,
Detroit 21, Mich.
Filed Feb. 3, 1958, Ser. No. 712,847
41 Claims. (Cl. 180—82.1)

The present invention relates to a control mechanism or apparatus for "automatic throttles" as applied in automotive vehicles such as automobiles and trucks.

With the increasing use of non-stop highways, sometimes referred to as turnpikes, thruways, freeways, etc., there is an increasing need for an automatic throttle for automotive vehicles. When an automobile is driven for long distances on these non-stop highways, the operator's foot and leg muscles become tired and strained due to the necessity of holding the accelerator in the various desired positions for long periods of time. Since the operator also cannot change his body position, his back muscles also become strained. Such undesirable strain increases fatigue which in turn tends to produce drowsiness, and results in a large number of accidents on these non-stop highways. Also, when driving for long distances without stopping or slowing down in today's high powered cars, frequently the operator finds he has increased the vehicle speed excessively without realizing it.

An automatic throttle mechanism may be installed on an automotive vehicle to avoid the aforementioned problems. Such automatic throttle mechanism comprises some type of speed sensitive engine governor or other regulator suitably coupled with a control system or apparatus for controlling operation of the governor to perform the following functions: (1) to provide for selectable automatic operation of the carburetor throttle without the use of the foot during highway or turnpike driving to maintain a predetermined vehicle or engine speed, (2) to provide for *selection* of desired operating constant cruising speed, (3) to permit instantaneous and unrestricted overriding of the control mechanism by the accelerator pedal for passing and a return to regulated speed when the foot is removed from the accelerator and (4) to provide for instantaneous and foolproof disengagement of the automatic throttle operation upon a depression of the brake pedal.

Also, some control mechanisms for automatic throttle devices provide for operation of the governor mechanism thereof to produce a "push back" or resistance force acting on the accelerator in opposition to the operator's foot pressure after a preselected speed is attained. In this manner, the operator is warned by the excessive "push back" or added resistance force on the accelerator or its connected linkage mechanism that the desired speed is being exceeded. Although this increased "push back" force occurs fairly suddenly when the set speed is attained, it is still low enough that the operator may overpower the force by pressing hard on the accelerator to increase the vehicle speed any amount above the set speed. Hence this feature of the system, when included therein, provides merely a speed warning or alarm signal which is felt by the driver's foot as a sudden increased back force on the accelerator pushing back on the operator's foot as he tries to open the throttle above the set speed. The present invention is directed primarily to a new type of control mechanism for an automatic throttle system and is not concerned with the governor or regulator, except where certain features of the governor disclosed herein broadly enhance the particular control system in combination therewith. However, any governor device may be used with my control system.

The prior art shows numerous automatic throttle devices including various types of governors and control mechanisms therefor. Most of the control systems of these prior devices utilize as a power source to inactivate the governor mechanism a secondary source of energy which is available on automotive vehicles, such as electricity, or engine vacuum. In this respect it is important to appreciate that any such throttle control device has sole charge of the accelerator and throttle and hence engine power during automatic throttle operation. When placing automatic throttle devices in the hands of the general public, it is imperative from a safety standpoint that such devices be completely foolproof and reliable. When secondary sources of energy are used as the sole means to inactivate the device, such as by using a solenoid connected in the brake light circuit, the danger of electric failure is always present, and if a failure occurred the governor would not be inactivated.

Control systems having fully mechanical means to inactivate the governor mechanisms in automatic throttles are highly desirable in order to avoid the above-recited problems. However, some of the mechanical control systems used in automatic throttles, and even in throttle-holders, utilize ratchets or latches to release a spring upon application of the brake, which spring effects inactivation of the automatic throttle. This type of mechanical control system has the same disadvantage as the electric or vacuum powered control systems since a spring as used in this manner, comprises a secondary source of energy and is subject to failure.

Another problem in present automatic throttles resides in providing operation as an accelerator resistance or "push-back" speed warning indicator, which may sometimes be desired. Present mechanisms providing this feature are complex and tend to be expensive, and are disconnected by setting the governed speed at a very high value, beyond that expected in normal driving. Also, when these devices are operated in automatic throttle driving and the accelerator is depressed to increase the speed above the governed speed for passing, the extra force of the "push-back" unit or spring is added to the normal accelerator spring force.

A main object of the present invention is to provide a control mechanism of an automatic throttle system for an automotive vehicle which is simple, reliable and safe, and provides an improved method and means for controlling the system while overcoming all of the objections above recited.

Another object of the present invention is to provide a control mechanism of an automatic throttle system for an automotive vehicle which includes positive mechanical means to inactivate the automatic throttle operation by actuation of the brake pedal in a manner to restore the automotive vehicle to completely normal operation as effectively as though the entire automatic throttle mechanism were removed from the vehicle.

A further object of the present invention is to provide a control mechanism of an automatic throttle system for an automotive vehicle, as recited in the foregoing paragraph, including means to permit the vehicle-operator to depress the accelerator for overriding and increasing the speed unrestrictedly above the selected governed speed when the accelerator or throttle is being operated automatically, with no increase of the resistance of the accelerator above the normal resistance provided by the normal accelerator spring; and further so arranged that when the operator removes his foot from the accelerator pedal, the vehicle instantly and automatically reverts to automatic throttle operation.

Still another object of the present invention is to provide a control mechanism of an automatic throttle system for an automotive vehicle as recited in the foregoing paragraph which may include simple means to provide a selectable speed warning system in the form of a sudden and appreciable increase in the resistance of the accelerator pedal so that the operator's foot senses this increased resistance as a warning that the vehicle speed has reached the value preset by the driver, and wherein the added accelerator pedal resistance is low enough to permit the driver to force the accelerator to any wider open throttle position if necessary in emergencies despite this added warning force.

Another object of the present invention is to provide a control mechanism of an automatic throttle system for an automotive vehicle as recited in the foregoing paragraphs and including means to select the desired speed of the automatic throttle or accelerator feature of the system or the desired speed of the "push-back" or accelerator resistance speed warning system, such that one setting of a speed control knob or dial selects the same speed for both types of operation.

An important object of the present invention is to provide a control mechanism of an automatic throttle system for an automotive vehicle as recited in the foregoing paragraphs and including a novel selector mechanism to permit the driver to select either operation as an automatic accelerator or throttle, or operation as a "push-back" or accelerator resistance speed warning device, or to completely disconnect effectively the entire automatic throttle mechanism from the vehicle for completely normal operation in an "off" position of the selector mechanism, and wherein inactivation of the automatic throttle operation is effected by normal brake operation although it also may be effected manually; and furthermore after complete disconnection of the automatic throttle system in the "off" position of the selector unit, and when the automatic throttle or accelerator resistance operations are again activated without changing the position of the speed selecting means recited in the previous paragraph, the operating speed is the same as before the system was shut off.

Another very important object of the present invention is to provide a control mechanism of an automatic throttle system for an automotive vehicle, and including a governor mechanism, having novel means to permit actuating only the control means of the engine independently of the accelerator and linkage therefrom, but providing normal operative connection of the accelerator and engine control means when the governor mechanism is effectively inactivated.

A further object of the present invention is to provide a control mechanism of an automatic throttle system for an automotive vehicle as recited in the foregoing paragraphs in which all of the control functions or operations may be accomplished by various movements of a single knob or dial.

Further objects and advantages of the invention will be apparent from the following description, taken in connection with the appended drawings, in which:

FIG. 1 is a somewhat diagrammatic view of a complete installation of the control system of the present invention mounted in an automotive vehicle and showing its cooperation with a typical speed governor mechanism;

FIG. 2 is a diagrammatic view of a modified form of the operator's control portion shown in FIG. 1;

FIG. 3 is an elevational view of the selector unit of the control mechanism which facilitates operation of the system as an automatic throttle, as an accelerator "push-back" resistance speed-warning device, or for effectively disconnecting the entire apparatus from the vehicle in the "off" position, all at the selection of the vehicle-operator; the parts being illustrated in FIG. 3 in the "push-back" position;

FIG. 4 is a partial section of the selector unit of FIG. 3 as viewed along the line 4—4 in FIG. 3;

FIG. 5 is an exploded perspective view of the selector unit of FIGS. 3 and 4;

FIG. 6 is a perspective view of one of the detents or abutting members of the selector unit shown in FIGS. 3, 4 and 5;

FIG. 7 is a fragmentary elevational view of the selector unit with the detents moved into position for automatic throttle operation;

FIG. 8 is a partial section of the selector unit as viewed along the line 8—8 of FIG. 7;

FIG. 9 is a fragmentary elevational view of the selector unit with the detents moved into the "off" position for completely disengaging the governor mechanism from the throttle or its actuating linkages;

FIG. 10 is an enlarged fragmentary partial section of a portion of the control system mounted in the vehicle-operator's compartment as shown in FIG. 1, for providing manual selection of the speed at which the governor functions;

FIG. 11 is a section on line 11—11 of FIG. 10;

FIG. 12 is a fragmentary plan view of a modified speed-adjusting mechanism;

FIG. 13 is a fragmentary partial sectional view of a modification of one of the abutting means or stop members to provide a second auxiliary means for disengaging the governor during automatic throttle operation upon application of the brakes, which second means may optionally be provided as a safety factor;

FIG. 14 is a fragmentary view illustrating a modified construction of the mechanism shown in FIG. 1 to include an optional feature for physically preventing activation of the automatic throttle feature of the system unless the vehicle transmission lever is in "drive" position;

FIG. 15 is a sectional view taken on line 15—15 of FIG. 14;

FIG. 16 is a fragmentary view of the installation illustrated in FIG. 1 showing a modification of the means for engaging the governor mechanism;

FIG. 17 is a partial sectional view along the line 17—17 of FIG. 16;

FIG. 18 is a fragmentary perspective view showing the detent of the modification of FIG. 16;

FIG. 19 is a modification of the form of the invention shown in FIG. 16 to provide a second auxiliary release from automatic throttle operation;

FIG. 20 is another modification of the form shown in FIG. 16; and

FIG. 21 illustrates, as a modification of the form shown in FIG. 16, a novel double override mechanism, particularly adapted for reducing the required output forces from the governor mechanism for automatic throttle operation.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In accordance with the invention, I provide an improved control system for an automatic throttle installation in automotive vehicles including any kind of suitable regulating mechanism, such as a speed-sensing governor, which control system preferably is completely mechanical in its operation, particularly with respect to the inactivation of the device from automatic throttle operation upon application of the brakes. In accordance with this desired construction in one form of the invention, I provide selector means including override or lost-motion means to control the effective connection between the output member of the speed governor mechanism and the engine control member or its linkage to produce various relative positions therebetween, which positions are selectable by the vehicle-operator. I accomplish such desired co-action in this form of the invention by providing detent means disposed to be positioned by manually-controlled means, included as part of the selector means, to act as a pawl or detent in relation to an abutment or stop member or means associated with the linkage mechanism to permit relative motion in one direction, but to effect connection of the governor output member and the linkage mechanism in the opposite direction under certain conditions for the particular type of vehicle operation desired by the operator. I arrange one detent member to be set by the manually controlled means in one position of the selector means for detenting action in one direction so that for automatic throttle operation, movement of the engine control member, such as the throttle, is restricted or constrained by an abutting connection of the stop member and detent member in a reduce-speed direction except as permitted by governor operation but completely unrestricted in an increase-speed direction; and in which abutting connection the throttle and its linkage abut against the detent member in a reduce-speed direction, so that the throttle may be operated as though it were connected for operation by the governor mechanism, but may be overriden by the operator at any time to exceed the set speed without any increase in the normal force tending to move the accelerator to the idle position. In one form of the invention, I optionally arrange another detent member in another position of the selector means for detenting action in a direction opposite to that of the automatic throttle detent member and to provide an action reverse therefrom, in which the movement of the engine control member is restricted or constrained in an increase-speed direction by abutment of the governor output member with the detent member, or conversely. In this instance, the governor mechanism provides a restricting or constraining force, comprising a spring force in the forms shown, which adds to the normal accelerator return spring force at the set governor speed to act as a warning to the driver, but this added force is low enough that it can be overpowered by the operator at any time in emergencies. I provide, in one form of the invention, a third position of the selector means in which both of the aforesaid detent members are moved completely clear of the member operated or carried by the linkage mechanism to effectively completely disconnect the governor mechanism from the linkage mechanism entirely by mechanical means, in the preferred form, without the use of separate sources of energy. Also, in one form of the invention in which an automatic-throttle-detent member is provided and is disengaged from the abutting stop member by the brake, I provide a relative movement of the detent member and stop member which is approximately double the travel of the member carried by the throttle or its linkage.

In another form of the invention, I connect the selector means to actuate the stop means to provide manual selection of the automatic-throttle and/or push-back operations as above mentioned.

I provide operating manual controls as a part of the selector means preferably in the form of shaft means mounted inside the operator's compartment, and axially slidable and rotatable by a single operator's knob or dial, the axis of the shaft means being substantially co-directional with the movement of the brake pedal. In this form of the invention I mechanically connect the shaft means to operate the detent or stop means by suitable linkage, such as by a Bowden wire, so that axial movements of the shaft means selects either of the two detent members or the "off" position, as described. I provide mechanical means, as by linkage or Bowden wire or the like, connecting the shaft means to the speed-setting element of the governor mechanism such that rotation of the knob or dial by the operator sets or selects the desired operating speed at which the selected governor action occurs. I provide, in the preferred form of my invention, suitable mechanical means associated with the brake pedal and cooperable with the shaft means to effect desired axial movement thereof upon application of the brake to effect instantaneous movement of the selector means to carry the detent members clear of the member carried by the throttle linkage mechanism, whereby the entire automatic throttle system is in effect completely disconnected by positive mechanical means from the normal throttle and its linkage as though removed from the vehicle so that operation of the governor mechanism is either that for the speed warning system or is entirely "off." Furthermore, with this mechanism, I have provided that when the selector unit is set for the "off" position and later returned to the automatic throttle or to the speed-warning (accelerator-resistance) position, the operating speed is unchanged from the set speed before moving the selector member to its "off" position.

It is understood that the present invention may be used in any kind of highway or road vehicle such as for automobiles and trucks, and may control any kind of engine therein such as an internal combustion gasoline engine or diesel engine, a gas turbine, etc. The control system may also be used with any suitable speed governor mechanism or equivalent, or with any other kind of mechanism tending to correct throttle posiiton in any desired manner.

*Construction*

The form of the invention illustrated by the control system shown in FIGS. 1–11 will first be explained from a constructional standpoint before discussing the operation. In the drawings there is shown by way of example a portion of a typical automotive vehicle having a conventional shaft-type of brake pedal and accelerator with its usual linkage connected to the throttle.

Referring to FIG. 1, a portion of an automotive vehicle is illustrated in which a steering post 10 supports a steering wheel 12 and is shown in operative relation to a floorboard 13 to which an accelerator pedal 14 is suitably hinged. A conventional shaft-type brake pedal 15 is illustrated, although the suspended type of pedal may be used with the present invention. Only a portion of a typical engine included in the vehicle is illustrated in the form of a carburetor 16 having a butterfly throttle 17 for controlling the speed of the engine, which throttle is the equivalent of the conventional fuel control means of a diesel engine or gas turbine engine, for example, if used with the present invention. Conventional linkage mechanism is illustrated for connecting the accelerator 14 to the throttle 17. In FIG. 1, the accelerator linkage mechanism comprises a link 19 connecting the accelerator to a lever 21 fulcrumed at a fixed support 22 for transmitting reversely movements of the accelerator through a link 24 to a lever 26 for providing angular movements of the throttle 17, all biased in a throttle-closing direction by an accelerator spring 27. In FIG. 1, the accelerator and its portion of the link 19 are shown for clarity in a slightly smaller scale than other portions of the drawing. For purposes of this disclosure, the term "control means" as used herein and applied to the form illustrated in FIG. 1, shall include the throttle 17 and the accelerator 14 with all of its connecting linkage mechanism. In the form illustrated in FIG. 21, "control means" comprises the throttle 17, and may include its actuating elements 21, 24 and 26, or equivalents. Also, for purposes of this disclosure, any movements of either the hand or foot of the vehicle-operator, such as braking movements by foot, accelerator pedal actuation by foot, or operation of the control system of the present invention by either hand or foot shall be embraced by the term "manual" movements or operation.

All the mechanism shown in FIG. 1 in addition to that above described comprises the elements necessary for practicing the present invention. This added mechanism must include some type of governor mechanism or other means to regulate the throttle or control means in response to changes in a condition of vehicle operation such as vehicle or engine speed, manifold vacuum, etc. In FIG. 1, there is shown by way of illustration a speed governor of the tyype disclosed in my co-pending application, Serial No. 683,318, filed September 11, 1957, now Patent No. 3,084,758. Referring to FIG. 1, this governor mechanism comprises a signal unit or pressure generator unit generally indicated by the numeral 30, a brain or control unit to regulate engine vacuum as a source of energy and generally indicated by the numeral 32 and a servo-motor operated by the source of energy controlled by the brain unit and generally indicated by the numeral 34.

The signal unit comprises a rotary vane member 35 driven by the vehicle or engine, such as by the speedometer flexible shaft, and having one or more vanes for moving liquid 36 in a circular path in a cylindrical housing 38. The liquid is supplied from an air-vented reservoir 39 through passage 40 to an outlet located near the center of the vane member. Liquid pressure developed by the centrifugal force of the revolving liquid is transmitted in a pressure converter or transmitter chamber 41 through a body of air trapped between the liquid in the transmitter chamber and a sealed sensing diaphragm 42 pneumatically connected to chamber 41 through a conduit 44.

In the brain unit 32, a pilot valve 45 having a pair of oppositely tapered conical faces and supported by a pair of leaf springs is operatively connected to the diaphragm 42 for operation thereby in speed-responsive movements. The pilot valve controls the flow of fluid, which in the example illustrated, is air having flow induced by vacuum in the intake manifold, although any kind of fluid under pressure or vacuum may be used as a source of energy for the servo-motor. In FIG. 1, air under atmospheric pressure enters the brain unit at the inlet 47 and flows past the two tapered faces of the pilot valve and their respective seating members into a chamber 49, past a regulator valve 50 and through conduit 52 to the intake manifold. The vacuum in chamber 49 is maintained at a preselected value, such as 2½ to 5 inches of mercury by a pressure regulator comprising a diaphragm 53 connected to actuate the ball valve 50 and biased by an extension spring 55 for setting the predetermined regulated vacuum. The diaphragm is exposed on one side to the vacuum in chamber 49 and on the other side to the atmosphere. Thus when the vacuum in chamber 49 acting on the diaphragm tends to reduce, the regulator valve 50 automatically is opened by the spring 55 until the vacuum in chamber 49 is restored, and conversely.

The servo-motor, in the form shown, comprises a diaphragm 57 subjected to atmospheric pressure on its left side, as viewed in FIG. 1, and on the other side thereof to a variable vacuum in chamber 58 formed by the diaphragm housing 58a. The force on the diaphragm 57 produced by vacuum in chamber 58 is biased by a spring 60 retained by a mating diaphragm housing 63 and acting leftwardly on a retainer carried by a shaft 61 secured to diaphragm 57, which shaft is the governor output member. The diaphragm is secured to the shaft, as by riveting or upsetting, and is clamped between a pair of discs 62 and 62a. The left disc 62 is disposed to abut a stop portion 63a of the housing 63 when no vacuum exists in chamber 58. The vacuum in chamber 58 is determined by the position of the pilot valve 45 with relation to orifices which are oppositely varied by the conical faces thereof, and this modulated vacuum is transmitted to chamber 58 through a conduit 64. Thus when the pilot valve 45 moves to its extreme rightward position, as viewed in FIG. 1, atmospheric pressure is transmitted into chamber 58, and when the pilot valve is moved to its extreme leftward position the full regulated vacuum is transmitted to chamber 58; and intermediate positions of the pilot valve produce in the chamber 58 corresponding gradients of vacuum from atmospheric pressure to the regulated vacuum.

The speed-sensing forces of the sensing diaphragm 42 are biased by a speeder-spring 66, which in the form shown, is a leaf spring having one end freely acting on the pilot valve and its other end secured to a supporting member rotatable by a shaft (not shown) operated by an angularly movable speed-adjusting lever 67. Clockwise movements of lever 67 reduces the force of the speeder-spring 66 so that a lower pressure is required on sensing diaphragm 42, and hence a lower speed is necessary to bring the forces acting on the pilot valve 45 into balance, and conversely. For a set position of the lever 67, when the speed tends to increase, the pilot valve 45 is moved rightwardly, as viewed in FIG. 1, to reduce the vacuum on the servo-diaphragm 57 so that spring 60 moves the output shaft 61 leftwardly. A decrease in speed produces the reverse action. The particular governor mechanism illustrated herein is not part of the present invention, except where certain features of the governor broadly enhance the particular control system in combination therewith. Novel features of the specific governor mechanism disclosed herein are the subject of the above mentioned co-pending patent application, Serial No. 683,318. Although any governor using a separate source of energy may be used a servo-type governor is preferable in view of the large forces required to move the control means of the vehicle. In this respect, it is desirable for the governor mechanism to actuate the conventional throttle and its linkage mechanism with little or no revision from a normal automotive installation and without the addition of special bearings, or the like.

The forces developed by the servo-motor 34 of the governor mechanism and transmittable by the output shaft 61 are applied to the control means, in the form of the invention shown in FIG. 1, by a novel selector unit generally indicated by the numeral 70. The selector unit may be applied at any convenient point of the control means such as directly on the throttle lever 26 or anywhere on the linkage mechanism. In the example shown in FIG. 1, the selector unit is applied to an extension 21a of the lever 21. Referring to FIGS. 1–9, and, particularly FIGS. 3, 4 and 5, the extension 21a carries a stop member 72 secured thereto by suitable means as by upsetting of riveting. The stop member 72 has a peripheral groove 72a and a stop pin extension 72b of small diameter, as shown best in FIGS. 5, 8 and 9.

The selector unit illustrated in the drawings comprises a lost-motion or override member 74 connected by suitable means as by rivets to the governor output shaft 61 for actuation thereby. The override member includes a slot or track 75 received in the groove 72a of the stop member 72 to be supported and guided thereby for its movements with the shaft 61. A pair of spacers 76 are secured to the override member 74, and include peripheral grooves 78 at equal distances from the override member. In the forms shown, the override member 74 includes a circular opening 79 at the end of the slot 75 through which the stop member 72 is inserted during assembly for engaging the slot 75 at groove 72a.

A cross-slide or selector member 81 is supported by the spacers 76 for movements substantially transverse to movements of the override member in relation to the stop member 72. Such transverse movements may be in a straight line as illustrated, or arcuate, or at a slight angle in relation to movements of the override member. The selector member includes suitable means for guiding the transverse movements thereof at a predetermined distance from the override member in a plane parallel thereto. In the form shown, such guiding means comprises a pair of slots 82 in the selector member, the walls of which cooperate with the grooves 78 of the spacers 76. At the end of each slot 82 a circular opening 83 is provided for assembly by insertion of the spacers therethrough to engage the walls of the slots with the grooves 78. The selector member, in the forms shown in FIGS. 1, 3, 4, 5, 7, 8 and 9 carries a pair of swingable detent members 84 and 85, one of which is shown enlarged in perspective in FIG. 6. The two detent members are hingably supported by suitable means as by a pin 87 projecting through holes in ears, as 84a, and through holes in projections 81a of the selector member 81 for angular detenting or latching movements thereabout in relation to the selector member. The two detent members include an extension or limit portion 84b, 85b, which extends over the front side of the selector member, as viewed in FIG. 5, to limit or stop angular travel of the detent members in one direction but to permit angular travel thereof in the opposite direction. The two detent members also include an abutting portion or plate 84c which extends into the path of stop pin extension 72b for purposes to be described. In the forms shown, the detent member 85 is shorter in length than the detent member 84 for purposes discussed hereinafter. The detent members are normally biased into the angular positions shown in the figures by suitable means, as by the leaf springs 90 suitably secured at one of their ends, as by rivets, to the body of the cross slide member 81. In FIG. 1, the left leaf spring is omitted for clarity but is shown in FIGS. 3 and 5. The two detent members are limited in opposite angular directions for reasons to be discussed, as the limit portion 84b of the detent member 84 lies on the opposite side of the hinge pin 87 from the limit portion 85b of the detent member 85.

In the selector unit as above described, the selector member is guided by means of the spacers 76 in the slots 82 for movements in a direction transverse to the movement imparted to the selector unit 70 by the output shaft 61. In one position of such traverse movements, as shown in FIGS. 7 and 8, the extremity of the abutting plate 85c of detent member 85 is placed in the path of travel of the end of stop pin extension 72b in its movements in relation to the override member 74 guided by slot 75. In a second position of such transverse movements of the selector member 81, as shown in FIGS. 1, 3 and 4, the extremity of abutting plate 84c of detent member 84 is placed in the path of travel of the end of stop pin extension 72b in its movements in relation to the override member 74. In a third position of the selector member 81, as shown in FIG. 9, both detent members are moved completely out of the path of travel of stop pin extension 72b in movements relative to the override member.

The selector member is operated, in the forms shown, by manual control mechanism mounted inside the operator's compartment and connected to the selector member by suitable linkage. The entire combination of such control mechanism plus the selector unit will be referred to as the "selector means. Referring to FIG. 1, such manual control means includes a cylindrical shaft 92 supported by guide bushings 94 and 95 having bores (see FIGS. 10 and 11) to accommodate axial movements of the shaft. The bushings 94 and 95 are secured to any fixed part of the vehicle by any suitable means, such as to the steering post 10 by brackets 96 and 97, respectively. A manually operated speed selector member, knob 99, is secured at one end of the shaft by any suitable means for manual operation thereof. The shaft also includes a threaded portion 92a carrying an abutment member 101 having a threaded bore for axial adjustment of the abutment member in relation to the shaft, and being secured in a set axial position in relation to the shaft, as by a lock nut 103. An actuating arm 105 is supported at a hinge 106 for angular movements thereabout and includes an aperture 105a of smaller diameter than the abutment member 101 through which the shaft 92 is inserted. The hinge 106 is supported by any suitable means secured to any fixed part of the vehicle, as by a bracket 109 secured to the steering post 10. The brake pedal 15 (or its shaft) carries a plate or rod 111 suitably secured thereto for abutting the lower end of the actuating arm 105 as viewed in FIG. 1, and the actuating arm may be held in abutting position by any suitable means, as by a torsion spring at the hinge 106 (not visible in FIG. 1), although the spring is not essential. For automotive vehicles having suspended type brake pedals, the arm 105 would be replaced by a bracket, or the like, secured to the arm or lever carrying the brake pedal for angular movements about its supporting pin, which bracket would have an aperture arranged in relation to shaft 92 and abutment member 101 similar to the aperture 105a.

The shaft 92 extends through an opening in the floorboard 13 as shown in FIG. 1, and carries a swivel 113 comprising a housing 114 suitably secured to the shaft, as by riveting, in which a ball end of a rod or link 115 is retained by a cover 116 suitably secured to the housing. A bellcrank 117 is hinged at the fulcrum 119 secured to any fixed part of the vehicle and has one arm connected to the link 115 by a pin, or the like, and the other arm connected to suitable linkage mechanism for effecting transverse movements of the selector member 81 in accordance with axial movements of the shaft 92. In the form shown in FIG. 1, such linkage mechanism comprises a Bowden wire 120 connected to the bellcrank by suitable means as by a conventional rotatable connector used with Bowden wires on carburetors, choke-throttles, etc. The sheath or casing 122 of the Bowden wire is secured at one end to a fixed part of the vehicle by a bracket 123 and at the other end, in the form shown, by a bracket 125. The other end of the Bowden wire is hingably connected to a link 127 at one end thereof, the other end of the link being hingably connected to the selector member 81. Thus, axial movements of the shaft member effect the above-described transverse movements of the selector member for selecting the various operating conditions, to be described, by means of the bellcrank 117 and Bowden wire in a manner and for a purpose also to be described. In the form shown, the length or radius of the link 127 should be substantially the same as the radius of the stop member 72 moving about the fulcrum 22, so that movements of the selector unit 70 by the servomotor at its output shaft 61 will not produce relative movements of the selector member 81 and the override member 74, which relative movements should be effected solely by axial movements of the shaft 92.

Referring to FIG. 1, the shaft 92 is rotatable in the bushings 94 and 95 by revolving the knob 99, and the swivel 113 permits such manual rotation. Suitable linkage mechanism is provided to transmit such rotary movements of the shaft 92 to the speed-adjusting lever 67 of the governor mechanism. In the form illustrated in FIGS. 1, 10 and 11, this linkage mechanism comprises an arm or lever 130 secured to a sleeve 131 by suitable means as by upsetting or brazing. The bore of the sleeve is journaled on the outer cylindrical surface of the bushing 94 for relative rotation thereto. The bushing 94 has a semi-cylindrical slot 133 therein providing an opening therethrough for about 180 degrees. A retaining screw 135 having a pin extension 136 is threadably secured to the sleeve 131, as shown in FIGS. 10 and 11, and the pin extension projects through the slot 133 into an axial slot 138 in the shaft 92, so that the sleeve 131 is retained in axial relationship with bushing 94. With this construction, the shaft may be moved axially since the pin 136 remains in the slot 138. But when the shaft 92 is rotated manually by knob 99, the shaft engages the pin extension 136 in the slot 138 to effect corresponding angular movements of the sleeve 131 and lever 130 to the extent permitted by the length of slot 133 in limiting the angular travel of pin extension 136 projecting through slot 133. A Bowden wire 140 connects the end of the lever 130 to the speed-adjusting lever 67 by suitable means, as by the typical swivel connector 142 used with Bowden wires for carburetor throttles. The sheath 144 of the Bowden wire is secured at one end to a fixed part of the vehicle as by a bracket 145 and at the other end by a bracket 146. Thus, by means of a single manually controlled knob 99, axial movements thereof effect movements of the selector member in a manner to be described, and rotary manual movements of the knob produce speed-selecting movements of the lever 67 to control the regulating speed of the governor mechanism.

A single small tactile indicating projection 99a or its equivalent, which might be termed a "braille" indicator, is secured to the knob, or otherwise made a part thereof to comprise a tactually sensible portion of the knob. With this construction the approximate angular setting of the knob may be felt by the vehicle-operator; whereby he can set the desired speed by feeling the relative position of the tactile portion without taking his eyes off the road. This is preferred to any kind of calibrated dial, or the like, which requires visual selection by the operator, and which requires that he take his eyes off the road. Any suitable friction means, such as those frequently supplied with carburetor choke Bowden wires may be provided to maintain any set axial and rotary positions of the shaft 92.

An optional feature shown in FIGS. 1 and 2, comprises an electric circuit controlled by a button-switch 150 mounted on the steering wheel 12 and normally biased into its open position by a spring 151 for activating the automatic-throttle operation in a manner to be described. The button-switch 150 is in series with a switch 152 controlled by the transmission selector lever and also is in series with the vehicle battery 153 and the ignition switch 155 which controls a portion of the electrical load 157 of the vehicle; also a solenoid or electromagnet 159 is connected in this series circuit by means of a wire 160. The switch 152 comprises one form of "safety means" which would be controlled by means incident to normal inactivation of the vehicle, such as the usual transmission selector lever and shaft (not shown) which is connected to the switch 152 by a link 154 to render the device inoperative. The switch 152 is closed when the transmission selector is in "drive" or high gear position. The solenoid 159 includes an armature 162 connected by a link 164 to an arm of the bellcrank 117. With this electrical activation system, the manual pressing of the button-switch 150 when the ignition switch 155 is closed energizes the solenoid 159 to move the shaft 92 and its knob 99 into its extreme leftward axial position, as viewed in FIG. 1, to place the selector member into its extreme upward position, as viewed in FIG. 7 or 8, for operation to be discussed. As shown in FIG. 2, the knob 99 and its connected shaft 92 may be conveniently mounted on the steering post 10 so that the knob is readily accessible to the vehicle operator.

*Installation and Adjustment*

For normal operation, the system must be properly installed and adjusted so that the various components are in their correct geometric relationships. The Bowden wire 120 at the bracket 125, in the form shown, preferably is located directly below the fulcrum 22 of lever 21, as viewed in FIG. 1, so that the arcuate path produced by the selector unit is equal on each side of the vertical axis through the fulcrum 22. The servo-motor 34 is mounted in a position such that with no vacuum in chamber 58 the spring 60 causes disc 62 to abut against the stop 63a; and with the throttle 17 in its idle position, the stop pin 72b preferably is located in a position immediately on the left side of the abutting plate 85c of detent member 85 as would be viewed in FIG. 3 if the detent members 85 were in the same transverse position as shown in FIG. 7. This is done as a safety factor so that if the automatic throttle detent member 85 is inadvertently moved into alignment with the stop pin 72b when the engine is off, the detent member would not suddenly carry the throttle and its linkage mechanism to a wide-open-position when the engine is started and vacuum is transmitted to chamber 58 by the pilot valve 45. This would occur at idle or low speeds after starting the engine if the speed-adjusting lever 67 is set for a higher speed when the pilot valve 45 is maintained in its extreme leftward position, as viewed in FIG. 1, whereby the full regulated vacuum in chamber 49 would be transmitted to diaphragm 57 as soon as the engine is started; and although the throttle would be released by instantly stepping on the brake as will be explained, the surprise element might be hazardous.

It is important that the selector member 81 be properly adjusted in relation to the axial position of the shaft 92 and the abutment member 101. For proper adjustment before securing the Bowden wire 120 in operating position, the selector member is set in its extreme upward position as limited by the spacers 76 as shown in FIG. 7. The shaft 92 is then pulled by the knob 99 to its extreme leftward position as viewed in FIG. 1, until the abutment member 101 contacts or is adjacent to the arm 105 which, in turn, abuts the plate 111 when the brake pedal is in its normally free position. The abutment member 101 is adjusted to permit sufficient axial travel of the shaft rightwardly, as viewed in FIG. 1, in order not to interfere with normal brake pedal movements even when the oil is low in the brake system. With the shaft 92 moved leftwardly and the abutment member 101 contacting the arm 105 which in turn contacts plate 111, and with the selector member 81 in its uppermost position as shown in FIG. 7, the ends of the Bowden wire 120 are then secured and the elements of the system are in proper operating positions. If levers and similar linkage are used in place of the Bowden wire, then the abutment member is screwed to the right so that when the knob 99 is pulled to move the shaft to the extreme left position, axial movement thereof is limited only by movement of the selector member to its uppermost position, as shown in FIG. 7. Then with the elements in these positions, the abutment member 101 is screwed to a position contacting the arm 105 which, in turn, contacts plate 111 with the brake pedal in its normally free position.

*Operation*

The operation of the entire system constructed and adjusted as above described, during normal operation of the vehicle may be described in three selectable conditions as follows:

(1) *"Off" position.*—Consider the vehicle operating with the control system rendering the governor mechanism completely inoperative. For this condition, the knob 99 is pushed all the way in to effect axial movement of the shaft 92 to its extreme rightward position, as would be viewed in FIG. 1, as limited by the knob itself. In this position of the shaft 92, the bellcrank 117 and Bowden wire 120 moves the selector member into its "off" position as shown in FIG. 9 in which both detent members 84 and 85 are out of alignment with the path of travel of the stop pin extension 72b. With the selector member 81 in this position, the throttle 17 and its entire connecting linkage mechanism may be moved by the accelerator unrestrictedly throughout its normal travel just as though the entire governor mechanism and its control apparatus were removed from the vehicle, since the stop member 72 slides unrestrictedly in the slot 75. For this action, it is necessary for the length of the slot 75 to be at least double the travel of the stop member 72 in its normal travel with the throttle 17.

The foregoing requirement is necessitated by two conditions, which can be understood by an example in which the knob 99 and lever 67 have been adjusted to such a position as will give a definite speed that would require governor action, such as 50 m.p.h. for example. Then, with the selector member in the position shown in FIG. 9, and if the vehicle operator drives the vehicle at a speed *less* than 50 m.p.h., the pilot valve 45 remains at its extreme leftward position, as viewed in FIG. 1; at this time the full regulated vacuum is applied to diaphragm 57 to move the override member 74 to its extreme rightward position, as would be viewed in FIG. 1. This extreme position is limited or determined by the disc 62a or the diaphragm itself, or by any other suitable stop provided therefor. This position is such that when the throttle is moved to its wide-open-position, the stop pin 72b preferably is located slightly to the right of the position of the abutment plate 85c of the detent member 85, although it may be adjacent to the left side thereof if desired. In this situation, the throttle may be moved to any position from full load to no load, providing the length of the slot 75 extending on the left side of the detent members, as viewed in FIG. 1, is at least as long as the travel-length of the stop member 72 in its movements with such full-range throttle travel.

In the foregoing example, if the vehicle-operator drives the vehicle at a speed *above* 50 m.p.h., the pilot valve 45 is moved to its extreme rightward position, as viewed in FIG. 1, so that atmospheric pressure is applied to diaphragm 57 which permits spring 60 to move the override member 74 to its extreme leftward position, as would be viewed in FIG. 1, when disc 62 abuts the stop 63a. This position is such that when the throttle is moved to its wide-open position, the stop pin 72b is located at or near the right end of slot 75, as viewed in FIG. 1. In this situation, the throttle may be moved to any position from full load to no-load providing the length of the slot 75 extending on the right side of the detent members, as viewed in FIG. 1, is at least as long as the travel-length of the stop member 72 in its movements with such full-range throttle travel. Thus, the length of the slot 75 must be substantially double the travel of the stop member 72 such that the section of the slot on each side of the position of the detent members accommodates complete movements of the stop member in its movement with the throttle throughout its entire range; and with this arrangement, the throttle may be moved normally unrestrictedly irrespective of governor operation of diaphragm 57, so that any malfunctioning of the governor mechanism could not effect the normal driving of the vehicle in any way.

(2) *"Push-Back" operation.*—Now consider the vehicle operating with the control system providing added accelerator-resistance force, or "push-back" operation, to warn the driver that a preselected speed has been attained. For this condition, the knob 99 is pulled out part way to any intermediate position for moving the shaft 92 and selector member 81 to a position as shown in FIGS. 1, 3 and 4, in which the detent member 84 is in the path of travel of the stop pin extension 72b. With the selector member in this position and if the vehicle is at rest with the engine off, the spring 60 moves the selector unit 70 to its full travel to the left, as would be viewed in FIG. 1, until disc 62 abuts the stop 63a. Also, at this time the accelerator and throttle would be in its idle position so the relationship of the stop pin 72b and the position of the detent member 84 would be substantially as shown in FIG. 3. Assume the knob 99 has set the speed-adjusting lever 67 to cause the governor mechanism to operate at 50 m.p.h. When the engine is started, the full regulated vacuum in chamber 49 is applied to diaphragm 57 since the pilot valve 45 is in its extreme leftward position at idle. This vacuum causes diaphragm 57 to move the selector unit 70 to its extreme rightward position, as viewed in FIG. 1, so that the stop pin then stands at the extreme left end of the slot 75 since the accelerator has not yet been moved from its idle position.

When the vehicle operator depresses the accelerator pedal and the vehicle begins to accelerate, the stop member 72 is gradually carried by the accelerator linkage to the right, as viewed in FIG. 1. When the vehicle speed attains the pre-set speed, which is 50 m.p.h. in this example, the pressure developed by the signal unit 30 and acting on diaphragm 42 causes pilot valve 45 to move to the right and reduce gradually the vacuum in chamber 58 (but in a very small change of speed) until atmospheric pressure is applied to diaphragm 57. This action at 50 m.p.h. causes the spring 60 to move the selector unit 70 leftwardly, as viewed in FIG. 1, until the abutting plate 84c of the detent member 84 contacts and abuts the stop pin extension 72b, so that the force of spring 60 is applied rather suddenly to the accelerator linkage in a throttle-closing direction. At this time, all elements are exactly as shown in FIG. 1, and the operator "feels" this sudden added force on the bottom of his foot to warn him that the vehicle has attained the pre-set speed. He then merely holds his foot "against" this added force as he drives the vehicle regardless of its attitude, and the set speed will not be exceeded. As the vehicle ascends a hill, the action of the governor mechanism as previously described will cause the detent member 84 to abut the stop pin 72b at a wider throttle opening; and for descending a hill, the abutment occurs at a lower throttle opening. For passing or otherwise exceeding the set speed in emergencies, the operator can press hard on the accelerator pedal to overpower the spring 60, so that the stop pin extension 72b which abuts the abutting plate 84c moves the selector unit 70, the shaft 61 and diaphragm 57 rightwardly, as viewed in FIG. 1, to obtain any desired opening of throttle 17 up to wide-open position. When the operator removes his foot from the accelerator, as when applying the brakes, the accelerator and throttle instantly return to idle position, and as the vehicle speed reduces below 50 m.p.h., the governor again applies vacuum in chamber 58 to move the selector unit to its extreme rightward position. Any desired vehicle speed at which the "push-back" force of spring 60 occurs may be selected by the driver by rotating knob 99. In this manner, the present invention may be used for providing a warning to the driver that the vehicle speed has reached the existing speed limit in any speed zone, which warning speed may be changed by the driver as the speed limit changes in different zones.

Although any working pressure fluid may be used in the governor mechanism under vacuum or pressure, as explained in my co-pending application, Serial No. 683,318, the use of engine vacuum as a power fluid arranged with the servo-motor spring 60 acting in a throttle-closing direction produces a unique feature. To understand this feature it is desirable to consider the example in which the regulated vacuum in chamber 49 is set at about three inches of mercury. Then at any rate of acceleration in which the manifold vacuum is higher than three inches of mercury, the "push-back" operation is as above described. But if the acceleration is done at or near wide-open-throttle at which time the manifold vacuum is less than three inches of mercury, there is insufficient vacuum in chamber 58 to overpower the spring 60 at all speeds below the pre-set speed. Thus the "push-back" will occur at all speeds for very fast acceleration to act as a deterrent for "hot-rod" driving in the city. But if the acceleration is normal as is usually done at part-throttle operation, to produce manifold vacuums of four to eight inches of mercury, the "push-back" force does not occur until the pre-selected speed is attained.

(3) *"Automatic Throttle" operation.*—In many situations, as previously explained, when driving an automotive vehicle, such as for turnpike driving, it is desirable for the operator to be able to remove his foot and have the throttle automatically operated. For this condition, the knob 99 is pulled out all the way to the left, as viewed in FIG. 1, moving the shaft 92 to the position above described in which the abutment member 101 contacts or is adjacent to the arm 105 and the selector member is in the position as shown in FIGS. 7 and 8. In this position of the selector member, the detent member 85 is in the path of travel of the stop pin extension 72b.

With the selector member in this position, if the vehicle is at rest with the engine off, the spring 60 moves the selector unit 70 to its full travel to the left until the disc 62 abuts the stop 63a. Also at this time, the accelerator and throttle would be in their idle positions in which the stop pin extension 72b would stand immediately at the left of the abutment wall 85c of detent member 85, instead of to the right as viewed in FIG. 7, for reasons previously explained. Assume that knob 99 is still set in the position to provide 50 m.p.h., as for the "push-back" operation. When the engine is started, the full regulated vacuum in chamber 49 is applied to diaphragm 57 since the pilot valve 45 is in its extreme leftward position, as would be viewed in FIG. 1. This vacuum causes diaphragm 57 to be the selector unit 70 to its extreme rightward position, as would be viewed in FIG. 1, so that the stop pin extension then stands at the extreme left end of the slot 75 since the accelerator has not yet been moved from its idle position.

When the vehicle-operator depresses the accelerator pedal and the vehicle begins to accelerate, the stop member 72 is gradually carried by the accelerator linkage to the right, as viewed in FIG. 1. When the vehicle speed attains the pre-set speed of 50 m.p.h., the action of the governor mechanism, as previously described, causes atmospheric pressure to act on diaphragm 57 so that spring 60 moves the selector unit 70 leftwardly, as viewed in FIG. 1, until the abutting plate 85c of the detent member 85 reaches the stop pin extension 72b. The operator then depresses the accelerator slightly further to move the stop pin extension 72b past the detent member 85 which then acts as a latch as it automatically swings on hinge pin 87 until the pin extension is clear of the detent member which then swings back to its normal position. The operator then removes his foot from the accelerator and the stop pin extension 72b is urged in a reverse direction by the accelerator spring 27 into abutting contact with the abutment wall 85c; and further leftward movement of the stop pin is prevented by the locking action of the extension limit 85b. Thus, the detent member 85 in cooperation with the stop pin extension 72b comprise means to provide automatic engagement of the governor or regulator mechanism with said control means. The elements of the selector unit are then in the position shown in FIGS. 7 and 8, and the system then operates in a governing action, described in the following paragraph, as though the shaft 61 were connected to, and a part of, the throttle 17 and its connecting linkage mechanism including the accelerator 14.

With the elements of the selector unit in this position as shown in FIGS. 7 and 8, as the speed tends to increase as when descending a hill, the signal unit applies more pressure to diaphragm 42 to move pilot valve 45 to the right, as viewed in FIG. 1, which reduces the vacuum in chamber 58, so that spring 60 moves the selector unit 70 to reduce the opening of the throttle 17 until the selected governed speed is restored. If the vehicle speed tends to reduce as when ascending a hill, the governor mechanism restores the selected governed speed (which is 50 m.p.h. in this example) in a reverse action. Any desired governed speed for automatic throttle operation may be selected by the operator by rotation of the knob 99.

As previously mentioned, although any governor mechanism may be used, a desirable feature of the speed governor illustrated herein, in which the spring tends to close the throttle and the working fluid tends to open the throttle, is that if the hoses or tubes connecting the governor components should break or leak, the spring 60 will close the throttle. Also, if the "push-back" feature is not provided, the spring 60 may be omitted if the accelerator spring 27 is strong enough to provide satisfactory governing. Then if the tubes or hoses leak or break, the spring 27 closes the throttle.

The automatic throttle may also be activated while the vehicle is being driven either with the knob 99 initially in the "off" position or in position for "push-back" operation. In either case, if the vehicle speed is *higher* than the pre-set governor speed and the knob is pulled out all the way to the left from either of these positions as viewed in FIG. 1, for automatic throttle operation, then the detent member 85 will stand on the left side of the stop pin extension 72b. The vehicle-operator then can remove his foot from the accelerator pedal 14 and the governor mechanism will automatically maintain the pre-set speed as above described, since the stop pin extension is moved into abutting contact with the detent member by spring 27. If the operating vehicle speed is *less* than the pre-set speed when the knob 99 is pulled into the automatic throttle position, the detent member will stand on the right side of the stop pin extension 72b, as viewed in FIG. 1. The vehicle-operator then must depress the accelerator until the stop pin extension moves to the right past the detent member 85 until it swings clear of the stop pin extension to provide automatic engagement of the governor mechanism and throttle, or similar control means. Then the driver can remove his foot and the detent member abutting plate 85c carries the throttle and its linkage in speed governing movements, as above described.

When the brake pedal 15 is depressed for normal speed-reducing movements of the vehicle, the plate 111 instantly and simultaneously moves the actuating arm 105 to the right, as viewed in FIG. 1; this action simultaneously moves the abutment member 101 and shaft 92 to the right, in FIG. 1, which moves the selector member 81 into the "push-back" position, as shown in FIGS. 3 and 4. When this braking action occurs, the detent member 85 moves downwardly and clear of the stop pin extension which then stands in the path of detent member 84 on the right side thereof. The accelerator spring 27 then instantly pulls the throttle and accelerator with its connecting linkage into the idle position, since the stop pin extension 72b passes unrestrictedly by the detent member 84 which swings clear thereof on hinge pin 87 until the stop pin extension has passed the detent member. The detent member abutting plate 84c, in the form shown, is long enough to lie in the path of travel of the stop pin extension 72b for all fully depressed positions of the brake pedal 15 irrespective of normal brake wear.

Thus when the control system is operating the vehicle in automatic throttle operation at a pre-set speed, as at 50 m.p.h., and the brake pedal is depressed in a vehicle-stopping direction, the automatic throttle is released and the control system is then in the "push-back" operation to provide a warning signal on the accelerator at the same pre-set speed of 50 m.p.h. Then, if it is desired to turn off the "push-back" operation, the knob 99 is pushed all the way in by hand to move the selector member into the position shown in FIG. 9, whereupon the stop pin extension 72b can slide freely in slot 75 completely clear of the path of travel of both detent members. Then, when the knob 99 is pulled out to either the "push-back" or automatic throttle positions, the operating speed of the governor mechanism for both types of operation will be substantially at the same pre-set speed as when moved to the "off" position, unless the knob 99 has been rotated in the interim. The automatic throttle operation may be rendered inactive at any time, without depressing the brake pedal, merely by manually moving knob 99 to its extreme rightward position, as viewed in FIG. 1.

In FIG. 1, an optional method is shown for moving the shaft 92 and selector unit 81 into automatic throttle position, which method is particularly advantageous for city driving with automatic throttle operation. Referring to FIG. 1, the vehicle-operator starts the engine and must move the transmission control lever into "drive" position with an automatic transmission or into high gear of a manual step-shift transmission, which action closes switch 152. Then the operator presses the button 150 to energize solenoid 159 which moves the shaft 92 and selector member 81 into position for automatic throttle operation as shown in FIGS. 7 and 8. The operation thereafter is as above described in relation to automatic throttle operation. I have found, in driving such devices which hold the throttle while removing the foot, that they are suitable for city operation as well as turnpike driving providing they can be activated by simple and effortless means located within close reach of the position of the operator's hand during normal operation of the vehicle. With the above-described electric system *only for initiating* the automatic throttle operation, such automatic operation is highly desirable in city driving on boulevards, main streets, etc., with the speed set for the zone limit such as 35 m.p.h., for example. There is no danger involved in using electricity only for *initiation*, because if the electric system fails, the automatic throttle operation cannot be obtained; and the release from automatic throttle operation is still produced by positive mechanical means as above described. In the absence of the electric system, I have found that such city driving use of automatic throttle operation is satisfactory merely by extending the knob 99 to project about three to four inches from the dash or instrument panel and located near the driver's knee to be readily accessible. Also for this purpose, axial movements of the knob 99 should be free with negligible resisting force.

FIG. 2 illustrates a most desirable arrangement of the operator's controls for the system. In FIG. 2, the shaft 92 may be installed inside the hollow steering post 10 so that knob 99 would be accessible to the driver in the center of the steering wheel. If the electric circuit controlled by the button-switch 150 is desired, it is also shown in FIG. 2, in operative relationship.

Having thus described the operation of the control system of the present invention, the inventive concept is unchanged by various modifications or reversals of the elements. For example, it would make no difference in the operation of the device if the selector unit were operatively connected to the arm extension 21a of the accelerator-throttle linkage and the stop member 72 connected to the shaft 61. The inventive concept also would be unchanged by any other such reversals of the selector unit 70 and the servo-motor 34 in relation to the accelerator-throttle linkage mechanism, providing the above-described operations are producible. In some automotive installations, clearance problems may prevent installing the selector unit directly on the accelerator linkage as shown in FIG. 1. In this event, any kind of link extension may be provided, in which an end of the link would be hingably connected to a point on the control means, as at the arm extension 21a, and the stop member 72 would be secured to the link extension at any desired distance to the right thereof, as viewed in FIG. 1. With this construction, the selector unit 70 would be positioned at the predetermined distance to the right of extension 21a to clear obstructions. The other end of the link extension must be guided, as by the shaft 61, and would carry a bushing, or the like, for that purpose. The compression spring 60 could be replaced with an extension spring to permit the guide bushing to move freely on the shaft 61. Other similar link extensions may be connected to the selector member, or to other elements of the control mechanism, without departing from the inventive concept in any way. Also, the detent member 84 could be made shorter and mounted with a space between it and the detent member 85, which space would be equal to the length of the detent member 84 as shown in the drawings. This arrangement provides a reversal of the sequence of operation. When the knob 99 is all the way out for automatic throttle operation and the brake is depressed in normal vehicle-stopping movements, the selector member would move directly into the "off" position. Then it would be necessary to push the knob 99 all the way in to provide "push-back" operation. If only the automatic throttle operation is desired, then the "push-back" detent member 84 would be omitted.

FIG. 12 shows a modification of the speed-adjusting means illustrated in FIGS. 1, 10 and 11 to provide a larger rotation of the knob 99 for a given angular travel of the lever 67. In FIG. 12, the elements therein corresponding to those in FIGS. 1, 10 and 11 are so numbered.

Referring to FIG. 12, the shaft 92 has an elongated splined portion having teeth 170, or the shaft might carry a similar member such as a gear. A bracket 172 is secured to the bushing 94, as by soldering or spinning, to replace the bracket 96 of FIG. 1. The bracket 172 is split for clamping to post 10 by a screw 173 and includes an extension 172a which supports a lever 175 fulcrummed on a pin 177. The lever 175 includes a semi-circular portion 172c having teeth 178 disposed to mesh with the spline teeth 170. The radius of the portion 172c is suitably greater than the radius of the shaft 92 at the splines 170 so that a given rotation of the shaft 92 by knob 99 will provide a lesser angular rotation of lever 175 in accordance with any desired ratio of the aforementioned radii. With this construction, the knob 99 with its tactile indicator 99a can provide any desired speed range (such as 25–90 m.p.h.) in one complete turn of the knob.

FIG. 13 illustrates a modification of the automatic throttle release means illustrated in FIGS. 7 and 8 to provide a second electric-powered auxiliary release in addition to the full mechanical release above described. Two release means might be desirable in view of the extreme importance of insuring the release of the accelerator from automatic throttle operation upon application of the brakes. Although a full mechanical release is preferable if only a single release means is provided, some automotive manufacturers might require a second auxiliary completely independent release system in the event that the positive mechanical system might have been incorrectly installed. Since the main release system would be mechanical, the secondary system can be electric since it is provided only to reduce the chance of failure to release. While the mechanical release system disclosed herein is preferred, any suitable brake release means (such as the electric release) may be employed as the main release without departing from the scope of this aspect of the invention, particularly if space should not permit installation of the mechanical system in some types of vehicles.

Referring to FIG. 13, the elements therein corresponding to the same elements in FIGS. 1, 7 and 8 are so numbered. In FIG. 13, the stop member 72c has a bore for carrying and guiding a stop pin 72d for axial movements thereof. A solenoid 181 is supported by a bracket 182 secured to the arm 21a by any suitable means, as by rivets. The stop pin is secured to an armature 180 of the solenoid 181 by any suitable means, as by pressing or soldering. The stop pin 72d also includes a stop pin extension 72e which is normally maintained in the position shown in FIG. 13 by a spring 183 to perform the same function as the stop pin extension 72b as above described. The solenoid is in a series circuit with the engine battery 153 and contact points 185 comprising a switch operated by a leaf spring 187 secured to the brake pedal arm. The contact points 185 are normally provided in the vehicle to close only when the brake pedal is depressed to operate the lights 190 at the rear of the vehicle; the lights are in series with contact points 185 but are in parallel with solenoid 181 so that if the light 190 fails, the solenoid can still be operated by the brake. The circuit also shows the electrical load 192 which is not controlled by switch 155 and load 157 controlled by switch 155. Thus, when the vehicle is in automatic throttle operation, and the brake pedal 15 is depressed, the contact points 185 close which energizes solenoid 181; this action causes the armature 180 to move stop pin 72d and its extension 72e rightwardly to clear the automatic throttle detent member 85, which simultaneously has been moved upwardly, as viewed in FIGS. 1 and 13, by the selector member 81 as a result of the brake action, as above described.

When the vehicle-operator removes his foot from the brake-pedal, the contact points 185 again open so that the spring 183 automatically returns armature 180 and extension 72e to their operating positions as shown in FIG.

13. It is apparent that the automatic throttle action will again be produced when the operator depresses the accelerator sufficiently to carry detent 85 past extension 72e and if the knob 99 stands in its far left position as would be viewed in FIGS. 1, 7 and 9 for the main brake release.

FIGS. 14 and 15 show a modification of FIG. 1 including an optional mechanism to restrain activation of the automatic-throttle operation while the vehicle is not in operation. This comprises another form of "restraining means" which prevents axial movement of the shaft 92 into automatic throttle operation unless the transmission control lever is in "drive" or high gear position. Referring to the restraining means illustrated in FIGS. 14 and 15, the shaft 195 of a conventional transmission control lever (not shown) carries a stop plate 197 which is suitably secured thereto, as by riveting. The stop plate has a central portion 198 cut away and through which the shafts 10 and 92 project. The plate also has a semi-circular portion 199 cut away from the lower portion of the plate, which plate is circular with respect to the shaft 195 as an axis. The shaft 92 carries a lock member 200 whose axial travel into automatic throttle position is blocked by the stop plate when in the position shown in FIG. 15, in which the transmission control lever is not in "drive" position or high gear. At this time the governor or regulator device is completely inoperative. When the transmission control lever is moved into "drive" position or high gear, the shaft 195 revolves the stop plate 197 clockwise to align the open circular portion 199 with the lock member 200, so that the shaft 92 may be moved into the automatic throttle position by the knob 99, and the lock member 200 moves into the position 200' shown in FIG. 14. The lock member also prevents angular movement of the transmission lever out of "drive" or high gear position until the brake pedal is depressed and the lock member moves axially enough to free the plate member for angular movements. If a push button control for the transmission is used, a cable or link 202 therefrom may be connected to an extension 204 of the plate 197.

FIGS. 16, 17 and 18 show a modification of the selector unit 70 from that shown in FIG. 1, and elements shown in FIG. 16 corresponding to those in FIG. 1 are so numbered. Referring to FIGS. 16, 17 and 18 the override member 74a does not carry the cross-slide selector member 81 of FIG. 1 and hence does not require the supporting extensions in a vertical direction as shown in FIG. 1. Instead, the override member has a pair of arms 206 and 207 bent upwardly, as viewed in FIGS. 16 and 18, to support a hinge pin 209 for carrying a detent member 210. The detent member has a pair of upturned ears 210a having suitable holes through which the hinge pin 209 projects for angular movements thereabout. The detent member also includes a pair of downturned ears 210b for purposes to be explained. A torsion spring 212, or its equivalent, has one end positioned by the ear 206 and the other end resting on the detent member to urge the ears 210b to normally abut the override member 74a. The stop member assembly is somewhat similar to that disclosed in FIG. 13, in which a stop pin 72d is slidable in a bore of a stop member 72c and has a stop pin extension 72e which, in operative position, projects out of the stop member 72c a predetermined amount for purposes to be described. The stop member 72c is secured to a bracket 214 by any suitable means as by staking or by a nut 215 as shown. The bracket is secured to the arm extension 21a by suitable means, as by rivets, to be carried therewith in movements of the throttle 17 and accelerator 14 including its linkage mechanism. The bracket includes a right angle extension 214a having a pair of downturned arms 214b for clamping the Bowden wire sheath 122 therebetween by means of a screw 217, or the like, so that the Bowden wire 120 and sheath move with the arm 21a. The stop pin 72d includes a cylindrical limit portion 72f of enlarged diameter to receive the end of the Bowden wire 120 which is secured thereto by suitable means, as by a screw 219. The stop member 72c is slidable in the slot 75 by means of the peripheral groove 72a. The ears 210b of the detent member permit the same to clear the end of the stop member 72c. The stop pin extension 72e projects enough to abut the end of the detent member, as shown best in FIG. 18.

The elements of the mechanism shown in FIGS. 16–18 are shown in automatic throttle position, in which the knob 99 and shaft 92 are in their extreme leftward position, as viewed in FIG. 1, to move the stop pin extension 72e into the position shown in FIGS. 17 and 18. Then the detent member abuts the stop pin extension as shown in the figures so that the governor mechanism can provide automatic operation of the throttle as above described in relation to the form shown in FIG. 1. The selector unit of the forms shown in FIGS. 16–18 (and FIGS. 20, 21 to be discussed) may include the stop elements 72d, 72c, 120, 122, etc. When the brake pedal 15 is depressed, the Bowden wire 120 pulls the stop pin 72d rightwardly as viewed in FIG. 17, so that the stop pin extension moves clear of the detent member incident to a very small initial travel of the brake pedal. The accelerator and throttle instantly are moved to idle position by the accelerator spring 27, whereupon the subsequent reduced vehicle speed causes the diaphragm 57 to move the override member 74a to its extreme rightward position as viewed in FIG. 16; this action is made possible by the length of slot 75 which is approximately double the normal travel of the stop member, as previously explained. The automatic throttle operaiton is re-activated by pulling the knob 99 to the left, in FIG. 1, to move stop pin extension 72e into the path of the end of the detent member. If the speed is less than the pre-set speed when the knob 99 is pulled out, the stop member will be at the left of the detent member as viewed in FIG. 16. Then, when the pre-set speed is attained or exceeded, the detent member 210 is moved leftwardly to slide over the pin extension 72e and snaps into the position shown in FIG. 18 after it has passed the stop pin, thereby providing automatic engagement of the governor mechanism and throttle. The vehicle-operator can then remove his foot from the accelerator.

If only "push-back" operation is desired, the detent member is mounted on the override member in a reverse direction with the abutting end thereof in the same position as shown in FIG. 16 in relation to the slot 75.

FIG. 19 illustrates the manner by which the auxiliary or alternate electric system for inactivating the automatic throttle operation, as shown in FIG. 13, may be applied to the form shown in FIG. 16. The elements in FIG. 19 which correspond to those in FIGS. 13 and 16 are so numbered. Referring to FIG. 19, the solenoid 181 is supported by a bracket 224 which is connected to the override member 74a by suitable means, as by rivets. The armature 180 is connected by a link to a bracket 226 secured to the end of detent member 210. Then, when the brake pedal is depressed with the vehicle in automatic-throttle operation, the stop pin extension 72e is moved clear of the normal position of the end of the detent member, as explained above. Also as a safety factor, the solenoid 181 is energized to raise the detent member 210 clear of the pin extension 72e in the event the pin extension fails to be pulled clear of the detent member. When the vehicle-operator removes his foot from the brake-pedal, the contact points 185 are again opened so that the spring 183 automatically returns armature 180 and detent 210 to their operating positions as shown in FIG. 19. It is apparent that the automatic throttle action will again be produced when the operator depresses the accelerator sufficiently to carry detent member 210 past extension 72e and if the knob 99 stands in its far left position as would be viewed in FIGS. 1, 7 and 9 for the main brake release.

FIG. 20 shows a modification of the override member from that shown in FIG. 16. In FIG. 20 the detent member 210 is replaced by a fixed abutment member 228 secured to the override member 74a by suitable means, as by rivets. With this arrangement, the system can provide both automatic throttle operation and "push-back" operation, although somewhat different from that above described and less desirable in some respects although it provides a simpler construction. With the modification shown in FIG. 20, it is necessary to wait until the pre-set speed has been attained before pulling out the knob 99, since no automatic detenting or latching action is provided. Then, the stop pin extension 72e would stand on the right side of the abutment member 228, as shown in FIG. 20. If the knob 99 is pulled all the way out before the pre-set speed is attained, the stop pin extension 72e would stand on the left side of the abutment member 228, as viewed in FIG. 20, and would then provide the "push-back" operation as above described. However, this "push-back" operation would be inactivated each time the brake pedal is depressed and would have to be re-set each time thereafter. In the form shown in FIG. 1, the "push-back" operation is not inactivated by brake action.

It is desirable in automotive installations to use a servo-motor 34 which is not excessively large, in order to facilitate installation. The required size of the servo-motor is determined by the pressures obtainable from the available working fluid, and by the forces required to overpower the springs such as spring 60 and accelerator spring 27. The size of the servo-motor may be reduced if the friction in the system is reduced such as the friction in the accelerator linkage, the carburetor throttle friction, etc. This consideration is particularly important if engine vacuum is used as a source of power. With engine vacuum, the regulated pressure in chamber 49 of the governor mechanism would usually be set at from 2½ to 8 inches of mercury or less in order to provide satisfactory governor operation at and near full load. FIG. 21 shows a novel "double override" system for reducing the forces required as well as reducing the friction for the foregoing purpose. Such construction reduces the required size of the servo-motor to enable much faster response thereof.

The double override system in FIG. 21 is illustrated as applied to the form of my invention shown in FIG. 16, and corresponding elements are so numbered. Referring to FIG. 21, the accelerator means 14 operates the linkage means, such as the link 19, and is operatively connected to another override or lost-motion means, comprising member 230 having a slot or track 232 therein supported and guided by a guide pin 234 secured to the lever 21. The guide pin 234 preferably inclluudes a peripheral groove (not visible in FIG. 21) cooperating with the slot 232 to facilitate relative movements of the link 19 and lever 21. The slot 232 is substantially as long as the travel of pin 234 as the throttle moves normally through its total travel. A spring 236 connects the carburetor throttle lever 26 to a fixed support 237 in the vehicle and acts to close the throttle with its actuating means, such as the lever 21, link 24, lever 26 and the throttle shaft.

The elements are shown in FIG. 21 in operation as an automatic throttle as above described in relation to FIG. 16. However, in the form shown in FIG. 21, the link 19 and accelerator 14 are not operated by the governor mechanism but remain in their idle position during automatic throttle operation, since the pin 234 slides in the slot 232 during speed-controlling movements of the governor mechanism. Thus, with this system, the servo-motor 34 does not have to provide the work required to operate the aceclerator pedal and link 19 shown diagrammatically in FIG. 21. This is the accelerator means and its linkage means, which usually comprise the largest part of the overall accelerator-throttle mechanism. The servo-motor only must operate, through its output means 61, the throttle 17 and its actuating means which is made as short as possible. Also, the servo-motor does not have to provide the force to overpower the accelerator spring 27, but only must overpower the servo spring 60 and throttle spring 236, which only provides enough force to close the throttle 17. While in automatic throttle operation, if it is desired to pass another vehicle, the operator depresses the accelerator which moves link 19 rightwardly until the left end of slot 232 abuts the pin 234 to cause the lever 21 to rotate clockwise and open the throttle while the stop member 72c moves in a rightwardly direction to leave the detent member 210. When the operator removes his foot from the accelerator, the elements return to the position shown in FIG. 21. The spring 27 may be made of less force so that its force plus the force of spring 236 is the same as the force of spring 27 in the forms shown in FIGS. 1 and 16. If the friction in the actuating means (lever 21, link 24, lever 26 and the throttle shaft) shown in FIG. 21 when connected to the throttle during automatic throttle operation is low enough, the force of the servo-spring 60 can be reduced; or the spring 60 may even be omitted providing the spring 236 gives enough force to overcome the friction in the throttle actuating means and in the throttle shaft.

When the brake pedal is depressed, the stop pin extension 72e is pulled clear of the detent member 210 so that the spring 236 moves the throttle 17 into its idle position and the guide pin 234 moves to a position adjacent the left end of the slot 232 of the override member 230. Then the throttle may be operated in a completely normal manner, since actuating of the accelerator moves the link 19 rightwardly to actuate lever 21 and open the throttle, while the stop member 72c rides unrestrictedly in the slot 75. If the knob 99 is pulled all the way out so that the stop pin extension 72e projects into the path of travel of the detent member 210, automatic throttle operation can be obtained as previously described. When the stop member 72c is moved into the position shown in which the lever 21 and throttle are held by the servo-motor, the operator can remove his foot from the accelerator so that the accelerator means and its linkage means then returns to and remains in its idle position while the override members 230 moves into the position shown in FIG. 21.

In the foregoing manner, the required force of the servo-motor may be reduced, since it only must operate the carburetor throttle and its short actuating means. For this purpose it is highly desirable to mount the stop member 72c and the two override members 74a and 230 as close as possible to the carburetor. For example, in those installations where space permits, these elements could be mounted directly on the accelerator lever 26 so that the servo-motor only must actuate the throttle 17, and the "actuating means" then comprises only lever 26 and the throttle shaft. In this example referring to FIG. 21, the guide pin 234 would be secured to the link 26, and the override member 230 would be connected to the link 24 instead of the link 19 to slide on the guide pin. Also, the stop member 72c would be connected to the lever 26 and the override member 74a would be guided by the stop member 72c and connected to the output shaft 61 such that the spring 60 tends to close the throttle. Then, the link 19 would be connected to the lever 21 as shown in FIG. 16.

Also illustrated in FIG. 21 is another type of auxiliary release means which may be used with fluid servo governors having the servo-motor spring, as spring 60, acting in a reduce-speed direction. With such governor mechanisms, as illustrated in FIG. 1 using engine vacuum as a power source, any kind of valve may be installed in the vacuum supply conduit 52 and connected to be operated by the shaft 92. In FIGS. 1 and 16, a plunger type valve, generally indicated by the numeral 240, is illustrated as an example. The valve 240 comprises the cylinder or sleeve 241 having ports 242 therein. A cylindrical plunger 243 is axially slidable in the sleeve and is arranged to open or close the conduit 52 at ports 242 in different axial positions of the plunger. A Bowden wire 244 or other linkage means is connected to the bell-crank 117 and is guided by a sheath 246, each end of which is secured to a fixed part of the vehicle, as by a bracket 247 in FIG. 21. In the positions shown in FIGS. 1 and 16, the knob 99 is not quite in its extreme leftward position so the vacuum in conduit 52 is shut off, and the spring 60 maintains the override member 74a in its extreme leftward position, as viewed in FIG. 21. When the knob 99 is moved out to its extreme leftward position, as viewed in FIG. 1, the plunger 243 uncovers the ports 242 so that vacuum is transmitted to the governor mechanism, and the automatic-throttle operation is produced as previously described. When the brake pedal 15 is depressed, the plunger 243 is moved upwardly, as viewed in FIG. 21, to shut off the vacuum to the governor mechanism, so that the spring 60 would close the throttle if the stop pin 72d fails to operate.

What I claim is:

1. In a control system for an automotive vehicle including an engine and manually movable control means therefor operable through a predetermined range of travel by the vehicle-operator, the combination of a regulator mechanism including a servo-motor disposed for operative connection with said control means for automatically producing forces acting thereon in response to changes in a condition of vehicle operation, a source of energy for operating said servo-motor, sensing means responsive to said condition-changes to regulate the application of said energy to said servo-motor, means to modify said operative connection comprising, a stop member, a detent member cooperating and relatively movable with said stop member, along a predetermined path, one of said members including slide means supporting the other said member for guiding said relative movements of said two members into latching engagement, means operatively connecting one of said last named two members to said servo-motor for operation therewith to enable said movement relative to the other said member, said detent member including latching means to allow said relative movement of said stop member past said detent member in one direction and also including limit means thereafter acting to prevent said relative movement of said stop member past said detent member in a reverse direction to provide for an abutting connection therebetween and a condition responsive action on said control means by said regulator mechanism at a predetermined value of said condition of vehicle operation, said control means being always manually movable unrestrictedly by the vehicle-operator to any normal travel position in which said stop member and said detent member stand away from said abutting connection and is unrestrictedly returnable thereto by the operator, and manually operated means supported with at least one of said two members to cause movement of one of said two members in relation to said other member to preclude said latching engagement.

2. The combination of means defined in claim 1, said slide means being sufficiently long to provide a total length of travel of said relative movements of said stop and detent members on each side of the position of said abutting connection approximately as long as the total length of travel of that one of said two relatively movable members that is carried by said control means through its full said range of travel.

3. In a selective mechanism including movable actuating means for transmitting forces and movements therefrom to means actuated thereby, an operative connection between said actuating means and said actuated means, means to modify said operative connection comprising, a stop member, a movable latching detent member cooperating with said stop member, said last named two members being relatively movable in a plane, one of said last two members being operatively connected to said actuating means, selector means supporting said detent member for latching movements in said plane to engage said stop member, said detent member including latching means to accommodate said relative movement of said stop member past said detent member and also including limit means thereafter acting to prevent said relative movement of said stop member past said detent member in a reverse direction to provide for an abutting connection therebetween, said actuating means during said abutting connection effectively transmitting said first named forces and movements, and means to move said detent member in a second direction transverse to said plane into a first position in the path of travel of said stop member to provide for said abutting connection and into a second position clear of the path of travel of said stop member for precluding said abutting connection.

4. In a selective control mechanism for an automotive vehicle including an engine and movable control means therefor operable by the vehicle-operator and including a brake mechanism and movable actuating means therefor, the combination of, a regulator mechanism including means disposed for operative connection with said control means for automatically producing forces acting thereon in response to changes in a condition of vehicle operation, means to modify said operative connection, manually operable selector means operatively associated with said modifying means to effect operation thereof in a first predetermined position of said selector means for enabling activation of said regulator mechanism for automatic operation of said control means to regulate the speed of the vehicle independent of manual operation of said control means by the vehicle-operator, said selector means being movable into a second predetermined position for causing said modifying means to change the effect of said regulating mechanism on said control means from that produced when said selector means is in said first position, said selector means including axially movable shaft means, guide means connected to a fixed part of said vehicle and supporting said shaft means for said axial movements, brake-actuated means associated with said shaft means, said shaft means including manually operated positioning means to move said shaft means axially in one direction for moving said selector means into said first position while moving said brake-actuated means to a position immediately adjacent said movable brake-actuating means with substantially no clearance therebetween, and said movable brake-actuating means being disposed to engage said brake-actuated means to cause axial movement of said shaft means in a reverse direction upon normal movement of said movable brake-actuating means in a vehicle-stopping direction to move said selector means into said second predetermined position.

5. The combination of means defined in claim 4, and said shaft means having at least a portion rotatable with respect to said guide means, and said regulator mechanism including a movable adjusting member for selecting a desired value of said condition, and means connecting said shaft means to said adjusting member and operable by manual rotation of said shaft means to adjust said regulator adjusting member.

6. The combination of means defined in claim 4, and said vehicle including a transmission having manual selector means therefor, said shaft means including a stop member movable therewith in said axial direction, a limit member operatively connected to said transmission selector means for actuation thereby and movable in a plane substantially transverse to the axis of said shaft means, said limit member in a first position thereof having a portion blocking axial movements of said stop member to prevent axial movement of said shaft means into said first position thereof when said transmission selector means is not in normal vehicle driving position, said blocking portion in a second position of said limit member being moved clear of said stop member when said transmission selector means is moved into a vehicle-driving position to permit axial movements of said shaft means and its connected first named selector means to said second position thereof.

7. The combination of means defined in claim 4, in which said condition of vehicle operation comprises the rotary speed of an element of the vehicle, and said positioning means having at least a portion rotatable and including a manually operated speed selector member mounted in the operator's compartment, and said regulator mechanism including movable speed-adjusting means for selecting a desired operational speed of said element, said rotatable portion of said positioning means including means to effect operation of said speed-adjusting means to select said desired speed of said element by manual rotation of said selector member without visual inspection thereof, said selector member including only a single tactually sensible portion adjacent its periphery for indicating by the sense of touch the angular position of said selector member to enable the vehicle operator to select the desired controlling speed of said regulator mechanism by feeling said angular position of said tactile portion without removing his sight from the road.

8. In a control mechanism for an automotive vehicle including an engine and control means therefor to set the speed of the vehicle, the combination of, actuating means operatively connected to said engine control means for effecting movements thereof, accelerator means operable by the vehicle-operator and including linkage means disposed for a first abutting connection with said actuating means to abut same only in an increase-speed direction, first biasing means acting on said accelerator means tending to move same into its idle position, second biasing means acting on said actuating means and said control means tending to move the same in a reduce-speed direction into abutment with said linkage means for providing said first abutting connection to enable normal cooperative movements of said accelerator means, and engine control means from idle position to full load position and to enable complete and unrestricted movements of said engine control means in an increase-speed direction regardless of the position of said accelerator means, a regulator mechanism for effecting regulating movements of said engine control means in response to changes in a condition of vehicle operation, said regulator mechanism including output means disposed to abut said actuating means only in an increase-speed direction to provide a second abutting connection therewith while said accelerator means is maintained in its idle position by said first named biasing means, said accelerator linkage means being disposed to move said actuating means out of said second abutting connection with said regulator mechanism output means upon vehicle-operator movements of said accelerator means in an increase speed direction into said first named abutting connection, and means to inactivate the regulator mechanism with respect to said actuating means, whereby said actuating means is controlled only by said accelerator means in normal movements thereof transmitted through said linkage means and said first abutting connection.

9. In a selective control mechanism for an automotive vehicle including an engine and movable control means therefor normally operable by the vehicle-operator and biasing means urging said control means towards its idle position, the combination of, regulator mechanism including linkage means for automatically producing forces acting on said control means in response to changes in a condition of vehicle operation, stop means, movable detent means cooperating with said stop means to provide a latching action therewith, one of said last two means being operatively associated with said linkage means, selector means to actuate one of said stop or detent means with respect to the other of said two means and having at least two predetermined positions of operation, said detent means and said stop means being disposed for effecting an abutting connection when said selector means is in a first of said positions, said selector means in said first position during said abutting connection positioning said actuated means for causing application of said forces on said control means in the same direction as and in addition to the normal force of said biasing means, whereby such additional forces oppose any manual force applied by the vehicle-operator on said control means in normal operation thereof to warn the operator that a predetermined value of said condition has been exceeded, said selector means in a second of said positions locating said actuated means for effecting disengagement of said abutting connection to inactivate said regulator mechanism with respect to said control means.

10. In a selective control mechanism for controlling the speed of an automotive vehicle including an engine and movable control means therefor normally operable by the vehicle-operator and biasing means urging said control means towards its idle position, the combination of, regulator mechanism including linkage means for automatically producing forces acting on said control means in response to changes in a condition of vehicle operation, stop means, movable detent means cooperating with said stop means to provide a latching action therewith, one of said last two means being operatively associated with said linkage means, selector means to actuate one of said stop or detent means with respect to the other of said two means and having at least two predetermined positions of operation, said detent means and said stop means being disposed for effecting an abutting connection when said selector means is in a first of said positions, said selector means in said first position during said abutting connection positioning said actuated means for causing application of said forces on said control means in the same direction as and in addition to the normal force of said biasing means, whereby said additional forces oppose any manual force applied by the vehicle-operator on said control means in normal operation thereof to warn the operator that a predetermined value of said condition has been exceeded, said actuated means being disposed for effecting a second abutting connection when said selector means is in a second of said positions, said selector means in said second position during said second abutting connection positioning said actuated means for causing application of said forces on said control means in an increase-speed direction as said vehicle speed decreases from a predetermined value thereof, and conversely, for effecting automatic operation of said control means by said regulator mechanism independent of manual operation by the vehicle-operator.

11. The combination of means defined in claim 10, and said detent means comprising said actuated means and including a pair of detent members mounted for movements in opposite directions, one of said detent members in said first position of said selector means providing said first abutting connection in one direction, the other of said detent members in said second position of said selector means providing said second abutting connection in a direction opposite from said last named direction.

12. In a selective control mechanism for controlling the speed of an automotive vehicle including an engine and movable control means therefor normally operable by the vehicle-operator and biasing means urging said control means towards its idle position, the combination of, regulator mechanism including linkage means for automatically producing forces acting on said control means in response to changes in a condition of vehicle operation, stop means, movable detent means cooperating with said stop means to provide a latching action therewith, one of said last two means being operatively associated with said linkage means, selector means to actuate one of said stop or detent means with respect to the other of said two means and having three predetermined positions of operation, said detent means and said stop means being disposed for effecting an abutting connection when said selector means is in a first of said positions, said selector means in said first position during said abutting connection positioning said actuated means for causing application of said forces on said control means in the same direction as and in addition to the normal force of said biasing means, whereby such additional forces oppose any manual force applied by the vehicle-operator on said control means in normal operation thereof to warn the operator that a predetermined value of said condition has been exceeded, said actuated means being disposed for effecting a second abutting connection when said selector means is in a second of said positions, said selector means in said second position during said second abutting connection positioning said actuated means for causing application of said forces on said control means in an increase-speed direction as said vehicle speed decreases from a predetermined value thereof, and conversely, for effecting automatic operation of said control means by said regulator mechanism independent of manual operation by the vehicle-operator, and said selector means in a third of said predetermined positions locating said actuated means to preclude any application of said forces on said control means for inactivating said regulator mechanism with respect to said control means.

13. In a selective control mechanism for an automotive vehicle including an engine and movable control means therefor, the combination of, a speed regulator mechanism including output means disposed for operative connection with respect to said control means for automatically producing forces acting thereon in response to changes in the speed of a moving element of said vehicle, one of said first two named means including stop means and the other of said first two named means including override means, said override means including means providing guided relative movements between said override means and said stop means along a predetermined path, a selector member for actuating one of said stop or override means and movable in relation thereto in a path substantially transverse to the said first named path into at least two predetermined positions of operation, override means including a detent member movable in relation thereto to provide a latching action with respect to said stop means in a first position of said selector member and adapted to effect an abutting connection with said stop means, said detent member including means to enable said relative movement of said detent member past said stop means unrestrictedly in a speed-increasing direction and also including limit means thereafter acting to prevent said relative movement in a reverse direction to produce said abutting connection, whereby in said first position to cause application of said forces on said control means in an increase-speed direction when the speed of said vehicle-element tends to reduce from a predetermined value, and conversely, for effecting automatic operation of said control means by said regulator mechanism independent of manual operation by the vehicle operator, said detent member being movable with said override means in said movements in relation to said stop means away from said abutting connection upon manual movement of said control means unrestrictedly by the vehicle-operator to any normal travel position on the high-speed side of said abutting connection and being unrestrictedly returnable thereto by the operator, and said selector member in a second predetermined position thereof in said transverse path changing the relationship of said detent means and said stop means to provide a different action of said regulator mechanism with respect to said control means.

14. In a selective mechanism for an automotive vehicle including an engine and movable control means therefor, and said vehicle including brake-actuating means, a device for operating said vehicle including a servo-motor disposed for operative connection with said control means to effect regulating movement thereof, a source of energy for operating said servo-motor, said device including sensing means responsive to a signal accompanying a change in the speed of the vehicle for regulating the application of said energy to said servo-motor, actuating means for transmitting forces and movements from said servo-motor to means actuated thereby in said vehicle, said device including means comprising a stop member and a movable abutment member cooperating with said stop member to provide an abutting connection between said actuating means and said actuated means, said last named two members being relatively movable along a predetermined path, one of said last two members being operatively connected to said actuating means, said abutment member including means to enable said movement thereof in relation to said stop member unrestrictedly from said abutting connection along said predetermined path in one direction but preventing said relative movement of said stop member past said abutment member in a reverse direction to provide for said abutting connection therebetween, said actuating means during said abutting connection transmitting said first named forces and movements to said movable control means, means to support and guide said stop member, manually operated means to move said stop member in relation to its support in a direction transverse to said first named direction to a first position in the path of travel relative to said abutment member to provide for said abutting connection and release means operatively associated with said brake-actuating means to cause movement of said stop member to a second position clear of the path of travel relative to said abutment member for precluding said abutting connection.

15. In a selective mechanism for an automotive vehicle including an engine and movable control means therefor, and a device for operating said vehicle, actuating means for transmitting forces and movements from said device to means actuated thereby in said vehicle, said device including means comprising a stop member and a movable detent member cooperating with said stop member to provide an abutting connection between said actuating means and said actuated means, said last-named two members being relatively movable along a predetermined path, one of said last two members being operatively connected to said actuating means, said detent member including latching means to enable said relative movement of said stop member past said detent member unrestrictedly along a predetermined path in one direction of said relative movement and also including limit means thereafter acting to prevent said relative movement of said stop member past said detent member in a reverse direction to provide for said abutting connection therebetween, said actuating means during said abutting connection effectively transmitting said first named forces and movements to said control means, carried by one of said members in its said movements along a predetermined path to actuate either of said two members in a direction transverse to said first named direction to a first position in the path of travel relative to said other of said two members to provide for said abutting connection and to a second position clear of the path of travel relative to said other of said two members for precluding said abutting connection.

16. The combination of means defined in claim 15 in which said means to move said actuated member includes electromagnetic means to effect said positioning of said actuated member.

17. In a selective control device for an automotive vehicle including an engine and movable control means therefor normally operable by the vehicle-operator, the combination of, an automatic regulator mechanism effective to provide a force in response to a signal corresponding to a change in a condition of vehicle operation, linkage means providing an operative connection for transmitting the force provided by said regulator mechanism to the control means, said linkage means including a pair of cooperating and relatively slidable elements, at least one of the elements of said pair including means to guide and support the other said element and effective to limit the relative sliding motion between the two elements to a single predetermined path, one of said elements including movable detent means having at least two predetermined positions of operation for determining the status of said operating connection, the other of said elements including stop means, said detent means in a first predetermined position including latch means to provide after said relative movements of said two elements in one direction automatic engagement of an abutting lost-motion connection with respect to said stop means which precludes said relative movement in a reverse direction to produce automatic operation of said regulator mechanism on said control means independent of manual operation by the vehicle operator, manually operated selector means in a first predetermined position thereof disposed to actuate one of said elements to alter said abutting connection for effecting a different action of said regulator mechanism with respect to said control means, and said selector means in a second predetermined position thereof locating said actuated element to enable engagement of said abutting connection.

18. In a selective control device for an automotive vehicle including an engine and movable control means therefor normally operable by the vehicle-operator, the combination of, a regulator mechanism effective to provide a force in response to a signal corresponding to a change in a condition of vehicle operation, linkage means providing an operative connection for transmitting the force provided by said regulator mechanism to the control means, said linkage means including a pair of cooperating and relatively slidable elements, at least one of the elements of said pair including means to guide and support the other of said elements effective to limit the relative sliding motion between the two elements to a single predetermined path, one of said elements including movable detent means having at least two predetermined positions of operation for determining the status of said operating connection, the other of said elements including stop means, said detent means in a first predetermined position including latch means to provide after said relative movements of said two elements in one direction an abutting connection with respect to said stop means which precludes said relative movement in a reverse direction to produce automatic operation of said control means by said regulator mechanism independent of manual operation by the vehicle-operator, manually operated selector means in a first predetermined position thereof disposed to actuate one of said elements to disengage said abutting connection for inactivating said regulator mechanism with respect to said control means, and said selector means in a second predetermined position thereof locating said actuated element to enable engagement of said abutting connection.

19. In a selective control device for an automotive vehicle including an engine having movable control means therefor normally operable by the vehicle-operator and biasing means urging said control means toward its idle position, the combination of, a regulator mechanism effective to provide a force in response to a signal corresponding to a change in the speed of a moving element of the vehicle, means for transmitting the forces provided by said regulator mechanism to the control means, selector means for establishing the status of said force-transmitting means with respect to said control means, said selector means in a first manually selected setting thereof including activating means to enable application of said forces on said control means in a reduce-speed direction at a predetermined speed of said moving element for providing speed-warning forces acting on said control means in addition to the normal force of said biasing means, said added force acting to oppose the normal manual force applied by the vehicle-operator as a warning that said predetermined speed has been attained or exceeded, and said selector means including means disposed in a second manually selected setting thereof to interrupt the transmission of said speed-warning force between said regulator mechanism and said control means.

20. In a selective control device for an automotive vehicle including an engine having movable control means therefor normally operable by the vehicle operator and biasing means urging said control means toward its idle position, the combination of, a regulator mechanism effective to provide a force in response to a signal corresponding to a change in the speed of a moving element of the vehicle, linkage means operatively connected to said mechanism for transmitting said force to the control means, said linkage means including a pair of cooperating and relatively slidable members, the first of said members including movable selector means having at least two predetermined manually selected positions of operation for establishing the status of said operating connection, the other of said members including first abutting means, said selector means including second abutting means disposed in a first predetermined manually selected position to engage said first abutting means to provide a cooperative abutting connection with respect thereto for enabling said force to act on said control means in a reduce-speed direction at a predetermined speed of said moving element in addition to the normal force of said biasing means, said added force acting to oppose the normal manual force applied by the vehicle operator as a warning that said predetermined speed has been attained or exceeded, and said selector means including means disposed in said second manually selected position to cause said one of said abutting means to disengage from said other abutting means for interrupting the transmission of said speed-warning force between said speed regulator mechanism and said control means.

21. In a selective control device for an automotive vehicle including an engine having movable control means therefor normally operable by the vehicle-operator and biasing means normally urging said control means toward its idle position and including vehicle brake-actuating means, the combination of, a regulator mechanism effective to provide a force in response to a signal produced by a change in the speed of a moving element of the vehicle, means for transmitting the forces provided by said regulator mechanism to the control means, selector means for establishing the status of said force-transmitting-means with respect to said control means, said selector means in a first manually selected position thereof including activating means to enable application of said forces on said control means in a reduce-speed direction at a predetermined speed of said moving element for providing speed-warning forces acting on said control means in addition to the normal force of said biasing means, said added force acting to oppose the normal manual force applied by the vehicle-operator on said control means as a warning that said predetermined speed has been attained or exceeded, said selector means in a second manually selected position thereof including means to enable application of said forces on said control means to produce automatic operation of said control means by said regulator mechanism independent of manual operation by the vehicle-operator, and means operated by said brake-actuating means for effecting movement of said selector means from at least said second position to another position thereof to interrupt the transmission of forces from said regulator mechanism to said control means for precluding at least said automatic operation upon a predetermined and normal movement of said brake-actuating means.

22. The combiantion of elements defined in claim 21, in which said activating means includes latch means providing a detent action with respect to said control means.

23. In a selective control device for an automotive vehicle including an engine having movable control means therefor normally operable by the vehicle-operator and biasing means urging said control means toward its idle position and including vehicle brake-actuating means, the combination of, a regulator mechanism effective to provide a force in response to a signal corresponding to a change in the speed of a moving element of the vehicle, linkage means operatively connected to said mechanism for transmitting said force to the control means, said linkage means including a pair of cooperating and relatively slidable members, the first of said members including movable selector means having at least two predetermined manually selected positions of operation for establishing the status of said operating connection, the other of said members including first abutting means, said selector means including second abutting means disposed in a first predetermined manually selected position to engage said first abutting means to provide a cooperative abutting connection with respect thereto for enabling said force to act on said control means in a reduce-speed direction at a predetermined speed of said moving element in addition to the normal force of said biasing means, said added force acting to oppose the normal manual force applied by the vehicle operator as a warning that said predetermined speed has been attained or exceeded, said selector means in a second manually selected position thereof including means to enable one of said abutting means included in one of said members to engage said other member for providing an abutting connection with respect thereto providing application of said force to said control means in an increase-speed direction to produce automatic operation of said control means by said regulator mechanism independent of manual operation by the vehicle-operator, and means operable by said brake-actuating means and operatively connected to said selector means to effect movement thereof from at least said second position to another position thereof to interrupt application of force from said regulator mechanism to said control means at least to preclude said application of forces in said increase-speed direction when said selector means stands in said second manually selected position upon a predetermined and normal movement of said brake-actuating means.

24. In a control mechanism for an automotive vehicle including an engine and control means therefor to set the speed of the vehicle and including vehicle braking means, the combination of, actuating means operatively connected to said engine control means for effecting movements thereof, accelerator means operable by the vehicle-operator and including linkage means, lost-motion means operatively connected to said linkage means and said actuating means and disposed for a first lost-motion abutting connection therebetween acting only in an increase-speed direction on said actuating means, first biasing means acting on said accelerator means and said linkage means tending to move same into its idle position, second biasing means acting on said actuating means and said control means tending to move the same in a reduce-speed direction into abutment with said linkage means for providing said first abutting connection to permit normal cooperative movements of said accelerator means and engine control means from idle position to full load position and to permit complete and unrestricted movements of said engine control means in an increase-speed direction regardless of the position of said accelerator means, a speed regulator mechanism for effecting automatic speed-controlling movements of said engine control means in response to changes in the speed of an element of the vehicle independent of manual operation by the vehicle-operator, said regulator mechanism including output means, second lost-motion means operatively connected to said output means and said actuating means and disposed to provide a second lost-motion abutting connection therebetween acting only in an increase-speed direction on said actuating means while said accelerator means is maintained in its idle position by said first-named biasing means, said accelerator linkage means being disposed to move said actuating means out of said second abutting connection with said regulator mechanism output means upon vehicle-operator movements of said accelerator means in an increase speed direction into said first-named abutting connection, and means operated by said vehicle-braking means to inactivate the regulator mechanism with respect to said actuating means and said control means, whereby said actuating means and said control means is controlled only by said accelerator means in normal movements thereof transmitted through said linkage means and said first abutting connection.

25. In a control device for an automotive vehicle including an engine having movable control means therefor normally operable by the vehicle-operator and biasing means normally urging said control means toward its idle position and including vehicle-braking means, the combination of, a regulator mechanism effective to provide forces in response to a signal produced by a change in the speed of a moving element of said vehicle, linkage means for transmitting said forces to the control means, said linkage means including a stop member and a cooperating detent member relatively movable along a predetermined path to provide a lost-motion abutting connection between said regulator mechanism and said control means, said detent member including latching means to enable said relative movement of said stop member past said detent member unrestrictedly along said predetermined path in one direction of said relative movement and also including limit means thereafter acting to prevent said relative movement of said stop member past said detent member in a reverse direction to provide for said abutting connection therebetween, said linkage means during said abutting connection effectively transmitting said first-named forces and movements to said control means, said linkage means including means to support and guide one of said members for movement relative to said linkage means, and manually operated means operatively connected to said linkage means and carried thereby in said movements along said predetermined path to cause movement of said supported member in relation to its support in a direction transverse to said first-named direction to a first position in the path of travel relative to the other of said two members to provide for said abutting connection, said last-named manually operated means including means operated by said vehicle-braking means to effect movement of said supported member completely clear of said other member for inactivating said regulator mechanism with respect to said control means.

26. In a control device for an automotive vehicle including an engine having movable control means therefor normally operable by the vehicle-operator and biasing means normally urging said control means toward its idle position and including vehicle-barking means, the combination of, a regulator mechanism effective to provide forces in response to a signal produced by a change in the speed of a moving element of said vehicle, said regulator mechanism including a servo-motor disposed for operative connection with said control means for actuation thereof, a source of energy for operating said servo-motor, sensing means responsive to said speed-change signal for regulating the application of said energy to said servo-motor, linkage means operatively connected to said servo-motor for transmitting said force to the control means, to effect speed-regulating movements thereof, said linkage means including a stop member and a cooperating detent member relatively movable along a predetermined path to provide a lost-motion abutting connection between said regulator mechanism and said control means, one of said members including means to guide and support the other of said members during all of said relative and speed-regulating movements thereof, said detent member including latching means to enable said relative movement of said stop member past said detent member unrestrictedly along said predetermined path in one direction of said relative movement and also including limit means thereafter acting to prevent said relative movement of said stop member past said detent member in a reverse direction to provide for said abutting connection therebetween, said linkage means during said abutting connection effectively transmitting said first-named forces and movements to said control means, release means including electromagnetic means operated by said vehicle-braking means to cause movement of one of said members completely clear of said other member for inactivating said regulator mechanism with respect to said control means.

27. In a control mechanism for an automotive vehicle including an engine and control means therefor to determine the speed of the vehicle and including accelerator means having linkage means disposed to be operatively connected to said control means for actuation thereof, the combination of, a speed regulator mechanism adapted to produce regulating forces providing automatic speed-controlling movements of said engine control means in response to changes in the speed of an element of the vehicle independent of manual operation by the vehicle operator, first lost-motion means disposed to operatively connect the regulator mechanism with the engine control means for transmitting said speed-regulating forces thereto only in an increase-speed direction, second lost-motion means disposed to operatively connect said accelerator means and said engine control means for transmitting thereto in only an increase-speed direction the forces applied on said accelerator means by the vehicle operator, first biasing means acting on said accelerator means in a reduce-speed direction to inactivate same during automatic operation of said regulator mechanism when said first lost-motion connection is engaged, and second biasing means acting on said engine control means in a reduce-speed direction tending to oppose either of said forces when applied.

28. In a control mechanism for an automotive vehicle including an engine and control means therefor to determine the speed of the vehicle and including vehicle braking means, and also including accelerator means having linkage means disposed to be operatively connected to said control means for actuation thereof, the combination of, a speed regulator mechanism adapted to produce regulating forces providing automatic speed-controlling movements of said engine control means in response to changes in the speed of an element of the vehicle independent of manual operation by the vehicle operator, first lost-motion means disposed to operatively connect the regulator mechanism with the engine control means for transmitting said speed-regulating forces thereto only in an increase-speed direction, second lost-motion means disposed to operatively connect said accelerator means and said engine control means for transmitting thereto in only an increase-speed direction the forces applied on said accelerator means by the vehicle operator, first biasing means acting on said accelerator means in a reduce-speed direction to inactivates same during automatic operation of said regulator mechanism when said first lost-motion connection is engaged, second biasing means acting on said engine control means in a reduce-speed direction tending to oppose either of said forces when applied, said first lost-motion means including a stop member and a detent member movable in relation to said stop member for providing a latching action and subsequent abutting connection with respect thereto upon predetermined lost-motion movements of said two members, one of said members being movable with said control means and the other of said members being movable with said regulator mechanism in said lost-motion movements and disposed to transmit said speed-regulating forces to said control means during said abutting connection, and means operated by said vehicle-braking means to effect movement of one of said members completely clear of the other said member for disengaging said abutting connection and hence said regulator mechanism with respect to said control means, whereby said engine control means is operable only by said accelerator means in normal movements thereof transmitted through said second lost-motion means by said vehicle-operator in opposition to said two biasing means.

29. In a control mechanism for an automotive vehicle including an engine and control therefor to determine the speed of the vehicle and including accelerator means having linkage means disposed to be operatively connected to said control means for actuation thereof, the combination of, a speed regulator mechanism adapted to produce regulating forces providing automatic speed-controlling movements of said engine control means in response to changes in the speed of an element of the vehicle independent of manual operation by the vehicle operator, said regulator mechanism including a servo-motor disposed to be operatively connected to said control means for effecting automatic speed-regulating movements thereof, a source of energy for operating said servo-motor, means responsive to said changes in the speed of said element for controlling the application of said energy to said servo-motor to effect regulating movements thereof in a speed-restoring direction, first lost-motion means disposed to operatively connect the servo-motor with the engine control means for transmitting said speed-regulating forces thereto only in an increase-speed direction, second lost-motion means disposed to operatively connect said accelerator means and said engine control means for transmitting thereto in only an increase-speed direction the forces applied on said accelerator means by the vehicle operator, first biasing means acting on said accelerator means in a reduce-speed direction to inactivate same during automatic operation of said regulator mechanism when said first lost-motion connection is engaged, and second biasing means acting on said engine control means in a reduce-speed direction tending to oppose either of said forces when applied.

30. In a control mechanism for an automotive vehicle including an engine having movable control means therefor normally operable by the vehicle operator and an idle spring urging said control means toward its idle position, the combination of, a regulator mechanism effective to provide forces varying in response to a signal corresponding to a change in the speed of a moving element of the vehicle, said regulator mechanism including a biasing spring disposed to act on said control means only in a reduce-speed direction to provide a warning force thereon in addition to the normal force of said idle spring, said mechanism including means to produce said speed-responsive forces acting to oppose and overpower the application of said warning force of said biasing spring on said control means when the speed of said element is less than a predetermined value thereof, and to enable said biasing spring to apply said additional warning force on said control means in said reduce-speed direction when the speed of said element exceeds the said predetermined value thereof to indicate to the vehicle-operator that said predetermined speed has been attained or exceeded.

31. In a control mechanism for an automotive vehicle including an engine having movable control means therefor normally operable by the vehicle operator and an idle spring urging said control means toward its idle position, the combination of, a regulator mechanism effective to provide forces varying in response to a signal corresponding to a change in the speed of a moving element of the vehicle, said regulator mechanism including a biasing spring disposed to act on said control means only in a reduce-speed direction to provide a warning force thereon in addition to the normal force of said idle spring, said mechanism including means to produce said speed-responsive forces acting to oppose and overpower the application of said warning force of said biasing spring on said control means when the speed of said element is less than a predetermined value thereof, and to enable said biasing spring to apply said additional warning force on said control means in said reduce-speed direction when the speed of said element exceeds the said predetermined value thereof to indicate to the vehicle-operator that said predetermined speed has been attained or exceeded, and selector means to enable the vehicle operator to effect an operative connection of said force-producing means of said regulator mechanism with said control means to apply forces thereon in an increase-speed direction to oppose said biasing-spring forces for effecting speed-restoring movements thereof to provide automatic operation of said control means by said regulator mechanism independent of manual operation by the vehicle operator.

32. In a speed control mechanism for an automotive vehicle including an internal combustion engine having an air intake passage with a throttle therein and vacuum in said passage, and including an idle spring urging said control means toward its idle position, the combination of, a regulator mechanism effective to provide forces varying in response to a signal corresponding to a change in the speed of a moving element of the vehicle, said regulator mechanism including a biasing spring disposed to act on said control means only in a reduce-speed direction to provide a warning force thereon in addition to the normal force of said idle spring, said mechanism including an air circuit communicating with said passage and exposed to said vacuum therein, a movable pressure responsive member communicating with said air circuit and operatively connected to said throttle to effect movements thereof, valve means responsive to changes in said speed of said element for increasing application of vacuum in said circuit to said pressure responsive member when the speed of said element decreases, and conversely, to effect speed-responsive movements thereof in an increase-speed direction and to produce said speed-responsive forces acting to oppose and overpower the application of said warning force of said biasing spring on said control means when the speed of said element is less than a predetermined value thereof, and said valve means decreasing the vacuum acting on said pressure responsive member to enable said biasing spring to apply said additional warning force on said control means in said reduce-speed direction when the speed of said element exceeds the said predetermined value thereof to indicate to the vehicle operator that said predetermined speed has been attained or exceeded.

33. In a speed control device for an automotive vehicle including an engine having movable control means therefor normally operable by the vehicle-operator and means biasing said control means in an idle direction, and also including vehicle brake-actuating means, the combination of, a speed-regulator mechanism effective to provide forces in response to a signal produced by a change in the speed of a moving element of said vehicle, said regulator mechanism including means for transmitting the forces provided by said regulator mechanism to the control means for effecting automatic speed-regulating movements thereof independent of manual operation by the vehicle-operator, manual means operable by the vehicle-operator in a first operational step to free said regulator mechanism from an inoperative status and to render said mechanism ready to be activated with respect to said control means, automatic engaging means operable after movement of the control means in an increase-speed direction by the vehicle-operator in a second operational step and including means automatically to effect activation of said regulator mechanism with respect to said control means, release means operatively associated with said brake-actuating means in a third operational step to temporarily inactivate said regulator mechanism with respect to said control means without producing said inoperative status by effectively interrupting temporarily the transmission of said forces only in an increase-speed direction upon a predetermined and normal movement of said brake-actuating means, whereby said second operational step can be repeated and said engaging means again can automatically effect activation of said mechanism without requiring said first-named manually operational step for said speed control device, and said regulator mechanism including means to provide a speed-responsive warning force acting on said control means in a reduce-speed direction in addition to the force of said biasing means when the speed of said element is greater than a predetermined value thereof, said added warning force acting to oppose the normal force applied by the vehicle operator on said control means to indicate that said predetermined speed has been attained or exceeded.

34. In a speed control device for an automotive vehicle including an engine having movable control means therefor normally operable by the vehicle-operator and means biasing said control means in an idle direction, and also including vehicle brake-actuating means, the combination of, a speed-regulator mechanism effective to provide forces in response to a signal produced by a change in the speed of a moving element of said vehicle, said regulator mechanism including a servo-motor to produce said forces and disposed to be operatively connected to said control means for effecting automatic speed-regulating movements thereof, a source of energy for operating said servo-motor, means responsive to said changes in the speed of said element for controlling the application of said energy to said servo-motor to effect regulating movements thereof in a speed restoring direction, said regulator mechanism including means for transmitting the forces provided by said servo-motor to the control means for effecting automatic speed-regulating movements thereof independent of manual operation by the vehicle-operator, manual means operable by the vehicle-operator in a first operational step to free said regulator mechanism from an inoperative status and to render said mechanism ready to be activated with respect to said control means, automatic engaging means operable after movement of the control means in an increase-speed direction by the vehicle-operator in a second operational step and including means automatically to effect activation of said regulator mechanism with respect to said control means, and release means operatively associated with said brake-actuating means in a third operational step to temporarily inactivate said regulator mechanism with respect to said control means without producing said inoperative status by effectively interrupting temporarily the transmission of said forces only in an increase-speed direction upon a predetermined and normal movement of said brake-actuating means, whereby said second operational step can be repeated and said engaging means again can automatically effect activation of said mechanism without requiring said first-named manually operational step for said speed control device.

35. In a control mechanism for an automotive vehicle including an engine and movable control means therefor normally operable by the vehicle-operator for setting the speed of the vehicle and including vehicle brake-actuating means, the combination of, regulator mechanism including linkage means for automatically producing forces acting on said control means in response to a signal accompanying changes in the speed of a moving element of the vehicle, said regulator mechanism including a servo-motor associated with said linkage means to produce said forces acting on the control means, a source of energy for operating said servo-motor, means responsive to said changes in the speed of said element for controlling the application of said energy to said servo-motor, stop means, detent means cooperating with said stop means for relative automatic latching movements with respect thereto, one of said last-named two means being operatively associated with said linkage means, selector means to actuate one of said stop or detent means for movement into at least two predetermined positions of operation, said detent means and said stop means being disposed to effect an abutting connection when said selector means is in a first of said positions, said selector means in said first position during said abutting connection positioning said actuated means for causing application of said forces on said control means in an increase-speed direction as said vehicle speed decreases from a predetermined value thereof, and conversely, for effecting automatic operation of said control means by said regulator mechanism independent of manual operation by the vehicle-operator, said selector means in a second of said positions positioning said actuated means to cause disengagement of said abutting connection to inactivate said regulator mechanism with respect to said control means, said selector means including manually operated means for moving said selector means from said second position to said first position, and release means operated by said brake-actuating means to move said selector means from said first position to said second position upon a predetermined and normal movement of said brake-actuating means in a vehicle-stopping direction.

36. The combination of means defined in claim 35, and in which said selector means includes a sheath and a flexible shaft slidable in said sheath, said flexible shaft being operatively connected to said actuated means to cause said movements thereof, means to secure said sheath at substantially one end thereof to a fixed portion of said vehicle, and means to secure said sheath at substantially the other end thereof to said linkage means.

37. The combination of means defined in claim 4, in which said condition of vehicle operation comprises the speed of a moving element of the vehicle, and said modifying means includes a member movable to establish operation of said regulator mechanism in said first position of said selector means, but to preclude operation of said regulator mechanism in said second position of said selector means, and said modifying means being operatively connected to said regulator mechanism for actuation thereby in speed-regulating movements thereof to provide said automatic operation of said control means when said selector means stands in said first position, and said shaft means including a sheath and a flexible shaft slidable in said sheath upon said axial movements, said flexible shaft being operatively connected to said movable member to effect said operational movements thereof, means to secure said sheath at substantially one end thereof to a fixed portion of said vehicle, and means to secure said sheath at substantially the other end thereof to said modifying means for enabling said flexible shaft and said sheath to be moved with said modifying means in said speed-regulating movements of said regulator mechanism, whereby said axial movements of said shaft are independent of said speed regulating movements.

38. The combination of means defined in claim 21, and said selector means in said first manually selected position being disposed to enable application of said forces on said control means only in said reduce-speed direction at said predetermined speed of said moving element for providing said speed-warning forces while precluding said automatic operation of said control means by said regulator mechanism, and said means included in said selector means in said second manually selected position being disposed to enable application of said forces on said control means to produce only said automatic operation of said control means by said regulator mechanism independent of manual operation by the vehicle operator while precluding application of said speed-warning forces acting on said control means in said reduce-speed direction when the vehicle-operator causes the vehicle speed to exceed said predetermined speed.

39. The combination of means defined in claim 33, and said automatic engaging means in said second operational step being disposed to enable operation of said regulator mechanism for effecting only said automatic speed-regulating movements thereof independent of manual operation by the vehicle-operator while precluding application of said speed-responsive warning force acting on said control means in a reduce-speed direction when the control means is moved by the vehicle-operator to cause the vehicle speed to exceed said predetermined value thereof, and said release means being disposed in said third operational step to temporarily inactivate said regulator mechanism with respect to said control means for enabling application of only said speed-responsive warning forces while precluding said automatic speed-regulating movements of said control means by said regulator mechanism.

40. The combination of means defined in claim 35, and said engine being of the internal combustion type having an air intake passage with a throttle therein and vacuum in said passage, and said servo-motor including a vacuum-responsive member adapted to be operatively connected to said control means for applying forces acting thereon only in its increase-speed direction, a vacuum circuit communicating with said vacuum responsive member and also with said vacuum in said passage to comprise said source of energy for operating said vacuum-responsive member, and spring means disposed to act on said control means only in its reduce-speed direction for biasing the vacuum force produced by said vacuum-responsive member, and said signal-responsive means including valve means in said vacuum circuit for controlling the application of vacuum acting on said vacuum-responsive member to effect regulating movements of said control means.

41. The combination of means defined in claim 35, and said vehicle including a member manually movable by the vehicle-operator, and restraining means operatively associated with said regulator mechanism and operable as a result of said movement of said member to establish said regulator mechanism in an inoperative status in relation to said control means when the engine is not moving the vehicle, and to enable said regulator mechanism to be manually activated whenever the vehicle is again being driven.

References Cited in the file of this patent

UNITED STATES PATENTS

| | | |
|---|---|---|
| 1,134,026 | Wheeler | Mar. 30, 1915 |
| 1,689,893 | Royce | Oct. 30, 1928 |
| 1,833,908 | Maybach | Dec. 1, 1931 |
| 2,283,478 | Warren | May 19, 1942 |
| 2,302,085 | Wolfe et al. | Nov. 17, 1942 |
| 2,519,859 | Teetor | Aug. 22, 1950 |
| 2,527,352 | Christian | Oct. 24, 1950 |
| 2,671,542 | Robnett | Mar. 9, 1954 |
| 2,692,980 | Platt | Oct. 26, 1954 |
| 2,708,979 | Reynoldson | May 24, 1955 |
| 2,714,880 | Riley | Aug. 9, 1955 |
| 2,755,877 | Kelem | July 24, 1956 |
| 2,816,617 | Lee | Dec. 17, 1957 |
| 2,916,100 | Teetor | Dec. 8, 1959 |
| 2,972,390 | Bunker et al. | Feb. 21, 1961 |
| 2,973,051 | Teetor | Feb. 28, 1961 |

OTHER REFERENCES

"Zone-O-Trol" publication. Zone-O-Trol Corporation of America, Inc., Minneapolis, Minn. (2 sheets), Nov. 25, 1936.